United States Patent
Zhao

(10) Patent No.: US 10,691,818 B2
(45) Date of Patent: Jun. 23, 2020

(54) SECURE INTERFACE FOR DISPLAYING OF INFORMATION

(71) Applicant: TENCENT TECHNOLOGY (SHENZHEN) COMPANY LIMITED, Shenzhen (CN)

(72) Inventor: Na Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 291 days.

(21) Appl. No.: 15/642,331

(22) Filed: Jul. 6, 2017

(65) Prior Publication Data
US 2017/0300711 A1    Oct. 19, 2017

Related U.S. Application Data

(63) Continuation of application No. PCT/CN2016/073881, filed on Feb. 16, 2016.

(30) Foreign Application Priority Data

Mar. 12, 2015  (CN) .......................... 2015 1 0109265

(51) Int. Cl.
*G06F 21/62* (2013.01)
*H04W 12/02* (2009.01)
(Continued)

(52) U.S. Cl.
CPC .......... *G06F 21/6218* (2013.01); *G06F 21/60* (2013.01); *G06F 21/6254* (2013.01);
(Continued)

(58) Field of Classification Search
CPC .. G06F 21/6218; G06F 21/6254; G06F 21/60; H04W 12/02; H04W 12/06; H04L 63/083; H04L 51/32
See application file for complete search history.

(56) References Cited

U.S. PATENT DOCUMENTS

2010/0054463 A1   3/2010 Tsan
2012/0140922 A1   6/2012 Annavajjala
(Continued)

FOREIGN PATENT DOCUMENTS

CN   101662765 A   3/2010
CN   101815267 A   8/2010
(Continued)

OTHER PUBLICATIONS

Notification of the First Office Action of Chinese application No. 201510109265.X, dated Dec. 3, 2018.
(Continued)

*Primary Examiner* — Christopher A Revak
(74) *Attorney, Agent, or Firm* — Anova Law Group, PLLC

(57) ABSTRACT

Disclosed are an information processing method and device and a computer-readable medium. The method includes: communication data is acquired from a communication link; the communication data is analysed to acquire attribute information of the communication data and first information carried by the communication data; a target information prompting manner is selected from at least two information prompting manners based on the attribute information; and the first information carried by the communication data is prompted in the target information prompting manner, wherein when the first information is prompted in a first information prompting manner, the first information and source information are presented in a first display interface, and when the first information is prompted in a second information prompting manner, second information and the source information are presented in a second display interface, and the first information is presented when the second display interface receives particular operation.

15 Claims, 19 Drawing Sheets

(51) Int. Cl.
*G06F 21/60* (2013.01)
*H04W 12/06* (2009.01)
*H04L 12/58* (2006.01)
*H04L 29/06* (2006.01)

(52) U.S. Cl.
CPC ............ *H04W 12/02* (2013.01); *H04L 51/32* (2013.01); *H04L 63/083* (2013.01); *H04W 12/06* (2013.01)

(56) References Cited

U.S. PATENT DOCUMENTS

| | | | | |
|---|---|---|---|---|
| 2013/0007665 | A1* | 1/2013 | Chaudhri | H04L 51/24 715/830 |
| 2013/0051558 | A1 | 2/2013 | Seiler | |
| 2013/0191910 | A1* | 7/2013 | Dellinger | G06F 3/0488 726/19 |
| 2014/0033299 | A1* | 1/2014 | McGloin | G06F 21/60 726/18 |
| 2014/0038561 | A1* | 2/2014 | Wang | H04W 12/02 455/411 |
| 2014/0283142 | A1* | 9/2014 | Shepherd | G06F 3/0482 726/30 |
| 2015/0003610 | A1 | 1/2015 | Seiler et al. | |
| 2015/0135298 | A1* | 5/2015 | Robison | G06F 21/31 726/10 |
| 2015/0281210 | A1* | 10/2015 | Weisberger | H04L 63/083 726/28 |
| 2016/0359839 | A1* | 12/2016 | Natividad | H04L 63/083 |
| 2018/0159809 | A1* | 6/2018 | Xie | G06F 3/0488 |
| 2018/0173883 | A1* | 6/2018 | Gandhi | G06F 21/32 |

FOREIGN PATENT DOCUMENTS

| | | |
|---|---|---|
| CN | 101895607 A | 11/2010 |
| CN | 101964962 A | 2/2011 |
| CN | 104144175 A | 11/2014 |
| CN | 104318183 A | 1/2015 |

OTHER PUBLICATIONS

International Search Report in international application No. PCT/CN2016/073881, dated May 24, 2016.
English Translation of the Written Opinion of the International Search Authority in international application No. PCT/CN2016/073881, dated May 24, 2016.

* cited by examiner

SECURE INTERFACE FOR DISPLAYING OF INFORMATION

CROSS-REFERENCE TO RELATED APPLICATIONS

This is a continuation application of International Patent Application No. PCT/CN2016/073881, filed on Feb. 16, 2016, which claims priority to Chinese Patent Application No. 201510109265.X filed on Mar. 12, 2015. The disclosures of these applications are hereby incorporated by reference in their entirety.

BACKGROUND

Along with development of the Internet, a communication application (such as a social application, a voice over Internet Protocol (IP) application and Internet-based communication between users supported in an Internet communication manner) has become a mainstream communication, a user may send information (such as a bank account and a password) relating to personal privacy of the user through a communication application under some conditions. In such a case, interception of data in a communication process may cause invasions to the personal information of the user and even cause life and property loss of the user.

According to a related technology, communication data bearing information is usually encrypted in a transmission process, and the communication data is decrypted to present the information after the information is transmitted to a target terminal (such as a mobile phone, a tablet computer and a laptop computer). Such a technology may only prevent the communication data from being stolen in the transmission process. In the related technology, there is yet no effective solution to guarantee security of the information and prevent the information from being maliciously stolen in a process of presenting information to the target terminal.

SUMMARY

The embodiments of the disclosure provide an information processing method and device and a computer-readable medium, which may guarantee security of information and prevent the information from being maliciously stolen in a process of presenting information to a terminal.

In one aspect, the embodiments of the disclosure provide an information processing method including that:
communication data is acquired from a communication link;
the communication data is analysed to acquire attribute information of the communication data and first information carried by the communication data; and
a target information prompting manner is selected from at least two information prompting manners including a first information prompting manner and a second information prompting manner, based on the attribute information, and the first information carried by the communication data is prompted in the target information prompting manner,
wherein when the first information is prompted in the first information prompting manner as the target prompting manner, the first information and source information may be presented in a first display interface; and when the first information is prompted in the second information prompting manner as the target prompting manner, second information and the source information may be presented in a second display interface, and the first information is presented when the second display interface receives a particular operation.

In another aspect, the embodiments of the disclosure provide an information processing device including:
a communication unit, configured to acquire communication data on the basis of a communication link;
an analysis unit, configured to analyse the communication data to acquire attribute information of the communication data and first information carried by the communication data;
a selection unit, configured to select a target information prompting manner from at least two information prompting manners including a first information prompting manner and a second information prompting manner, based on the attribute information; and
a prompting unit, configured to prompt the first information carried by the communication data in the target information prompting manner, wherein when the prompting unit prompts the first information in the first information prompting manner as the target prompting manner, the first information and source information may be presented in a first display interface; and when the prompting unit prompts the first information in the second information prompting manner as the target prompting manner, second information and the source information may be presented in a second display interface, and the first information may be presented when the second display interface receives a particular operation.

In yet another aspect, the embodiments of the disclosure provide a computer-readable medium for storing computer-executable instructions, the instructions being executed to cause at least one processor to execute the following operations of:
acquiring communication data on the basis of a communication link;
analysing the communication data to acquire attribute information of the communication data and first information carried by the communication data;
selecting a target information prompting manner from at least two information prompting manners; and
prompting the first information carried by the communication data in the target information prompting manner,
wherein when the first information is prompted in a first information prompting manner, the first information and source information may be presented in a first display interface, and when the first information is prompted in a second information prompting manner, second information and the source information may be presented in a second display interface, and the first information may be presented when the second display interface receives a particular operation.

According to the method, device described above, the prompting manner for information (the first information) carried by the communication data is determined based on the attribute information of the communication data. When the first information is prompted in the second information prompting manner, different from a condition of adopting the first information prompting manner, the second information (information different from the first information) and the source information are presented in the display interface, and the first information is presented when the display interface receives the particular operation. That is, reception of the first information is prompted by means of the second information, and thus the first information is not directly presented. A user indirectly learns about that the first information is received when the second information is acquired and prompted, so that the condition that the first information

DETAILED DESCRIPTION

In the related technology, information is usually encrypted in a transmission process of the information, and the information is decrypted and presented after the information is transmitted to target terminal equipment (such as a mobile phone, a tablet computer and a laptop computer). Such a method may only prevent the information from being stolen in the transmission process. It is difficult to guarantee security of the information in a process of presenting information to the target terminal equipment. For example, when a user views information through terminal equipment in a public place, there is yet no effective solution to prevent the information from being spied by others in the related technology.

Figure 1:
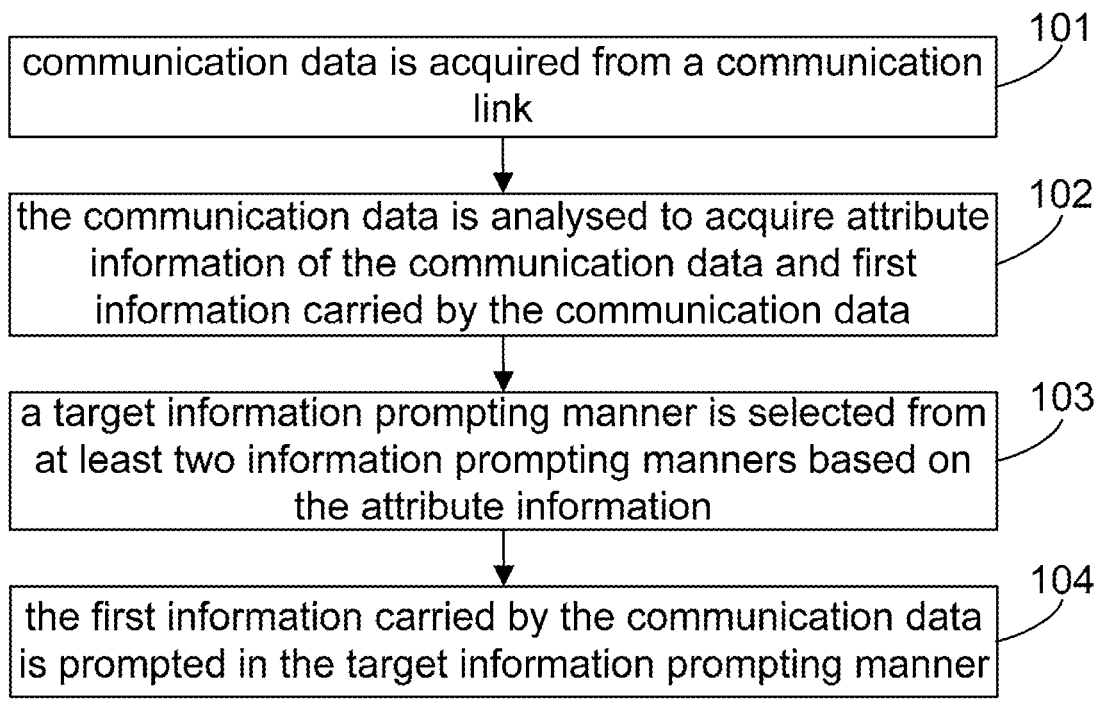
FIG. 1 is an implementation flowchart showing an information processing method according to an embodiment of the disclosure.

As shown in FIG. 1, when communication data is acquired on the basis of a communication link in Step 101, the communication data is analysed to acquire attribute information of the communication data and first information carried by the communication data in Step 102. In Step 103, an information prompting manner is selected from at least two prompting manners as a target prompting manner based on the attribute information. In Step 104, the first information carried by the communication data is prompted in the target information prompting manner. For example, when it is determined that privacy of the first information carried by the communication is not high (for example, it is allowed to be acquired by others) based on the attribute information of the communication data, a first information prompting manner may be adopted to prompt the first information, that is, the first information and source information are presented in a first display interface, so that a user may timely acquire the information. When it is indicated that the privacy of the first information carried by the communication data is relatively higher (that is, the first information is forbidden to be acquired by others) based on the attribute information of the communication data, a second information prompting manner may be adopted to prompt the first information, that is, second information (different from the first information) and the source information are presented in a second display interface, and the first information is presented when the second display interface receives a particular operation. That is, reception of the first information is prompted by means of the second information, and the first information is not directly presented, so that the first information is prevented from being spied and stolen in case of direct presentation, and security of the information is effectively guaranteed.

The disclosure will be further described below with reference to the drawings and embodiments in detail. It should be understood that specific embodiments described here are only adopted to explain the disclosure and not intended to limit the disclosure.

Figure 2A:
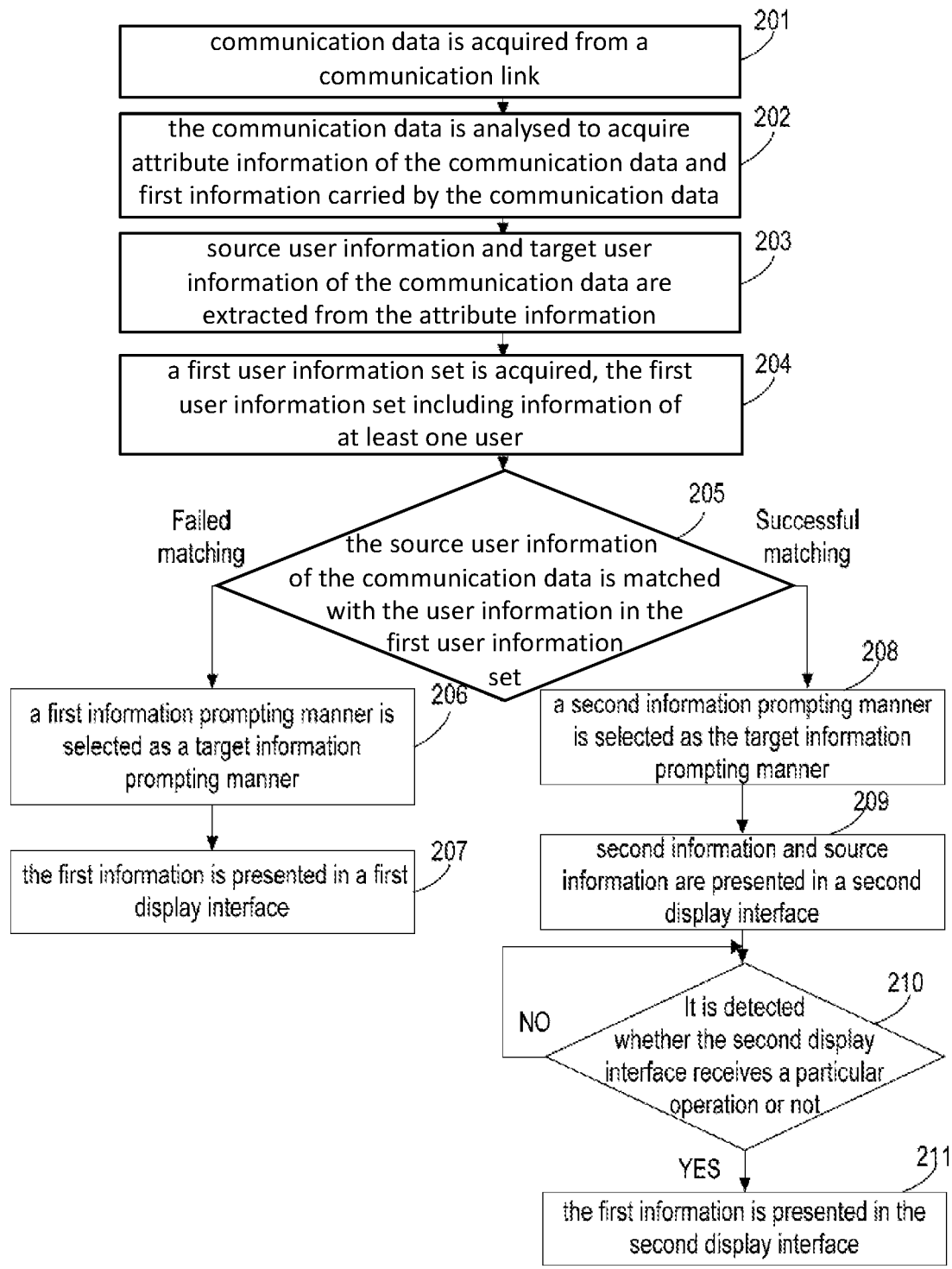
FIG. 2A is another implementation flowchart showing an information processing method according to an embodiment of the disclosure.

An embodiment is directed to an information processing method, which may be applied to terminal equipment such as a smart phone, a tablet computer, a portable computer, or a wearable-device. As shown in FIG. 2A, the information processing method provided by the embodiment includes the following steps.

Step 201: communication data is acquired from a communication link.

The communication link mentioned here is a data transmission channel based on the following data connections: a fibre channel data connection; a cable data connection; a Public Switched Telephone Network (PSTN) data connection; an Institute of Electrical and Electronic Engineers (IEEE) 802.3 and IEEE 802.11b/g/n-based network connection, a powerline, a cable and a PSTN; and an IP network connection supported by a communication network such as 3rd Generation Partnership Project (3GPP) and 3GPP2 networks.

Step 202: the communication data is analysed to acquire attribute information of the communication data and first information carried by the communication data.

Step 203: source user information and target user information of the communication data are extracted from the attribute information.

Based on different types of the communication data, the source user information and the target user information may adopt a unique identifier of a user. For example, when the communication data is communication data of a social application, the source user information and the target user information may adopt an account (such a number, called a social application number for short hereinafter) for registering the terminal equipment in the social application; and when the communication data is communication data of a short message of a mobile phone, the source user information and the target user information may adopt the mobile phone number.

Step 204: a first user information set is acquired, the first user information set including information of at least one user.

In the embodiment, the condition that the target user information indicates that the communication data has only one target user is discussed, the first user information set may be pre-set in the terminal equipment according to operation of the user. For example, in a social application, information (i.e. user information, which may adopt a form of social application number) of one or more contacts in the social application in the terminal equipment may be set into the first user information set.

Step 205: the source user information of the communication data is matched with the user information in the first user information set, Step 206 and Step 207 are executed in case of failed matching, and Step 208 and Step 209 are executed in case of successful matching.

Herein, the successful matching refers to such a situation that the source user information of the communication data is the same as the user information in the first user information set. In other words, there is user information in the first user information set which is the same as the source user information of the communication data. When there is no any user information in the first user information set which is the same as the source user information of the communication data, it refers to failed matching.

When the target user information indicates that the communication data has only one target user, it is indicated that the first information carried by the communication data is generated during point-to-point communication (i.e. communication with only two participant users). For example, for a social application, when a social application message (corresponding to the first information) is a point-to-point message, it is indicated that the social application message is required to be sent to only one user, and at this moment, if source user information of the social application message is matched with the user information in the first user information set (the user information in the user information set may be pre-set in the terminal equipment), it is indicated that the first information is required to be prompted in a second prompting manner to guarantee presenting security of the first information, which will be described by subsequent steps.

Step 206: a first information prompting manner is selected as a target information prompting manner.

Step 207: the first information is presented in a first display interface.

In Step 207, it is implemented that the first information prompting manner is adopted as the target information prompting manner. That is, the first information is directly presented in the first display interface, so that the user may timely acquire the first information. The first display interface mentioned here may be a full window or non-full window in the terminal equipment.

Step 208: a second information prompting manner is selected as the target information prompting manner.

Step 209: second information and source information are presented in a second display interface.

In Step 209, it is implemented that the first information is prompted in the second information prompting manner. That is, reception of the first information is prompted by means of the second information different from the first information. For example, when the first information is bank account information, the second information may correspondingly be any information such as "hello" different from the first information (the second information may be pre-set in the terminal equipment, and may also be randomly generated). Therefore, the effect of prompting the user of the terminal equipment that the first information sent by a user in the first user information set is received is achieved, and the first information is not directly presented, so that the first information is prevented from being leaked in a presenting process.

It is noted that both the first display interface and the second display interface are information presenting display interfaces of the same application, and the difference is that the first display interface is configured to directly present the first information while the second display interface presents the second information to prompt reception of the first information and presents the first information only when the second display interface receives a particular operation, which will be described by subsequent steps.

Step 210: it is detected whether the second display interface receives a particular operation or not, Step 211 is executed if the particular operation is received, otherwise it is continued to be detected whether the particular operation is received or not until the second display interface is triggered to be closed or switched to a background.

Here, the particular operation may be a particular point touch operation (such as a single-point touch operation and a multipoint touch operation) implemented on the second display interface, and may also be a particular swipe touch operation with a particular trajectory (such as a circle and a triangle).

Step 211: the first information is presented in the second display interface.

It is noted that the technical solution provided by the embodiment may be applied to any application with a point-to-point communication function on the terminal equipment, and subsequent descriptions are all made with reference to a particular application scenario in which a social application is taken as an example, which should not be considered as a limit to an application scenario of the embodiment of the disclosure.

Figure 2B:
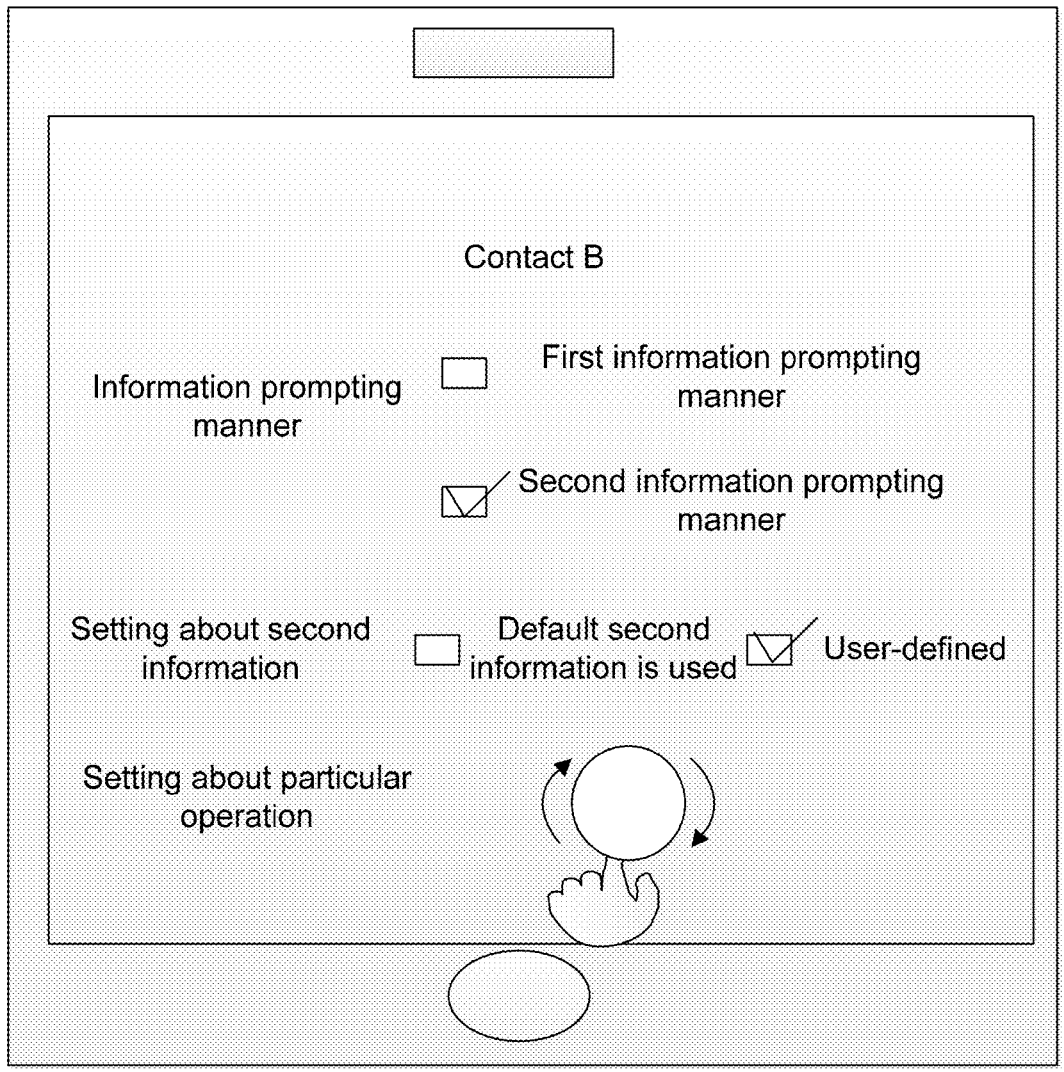
FIG. 2B is a diagram of setting an information prompting manner according to an embodiment of the disclosure.

FIG. 2B shows a scenario diagram. User A sets the following information of a corresponding social application contact, i.e. user B, through a social application setting interface in first terminal equipment shown in FIG. 2B:

(1) information from user B (which may be identified by a social application number of user B) is prompted in a second information prompting manner, and the first terminal equipment is triggered to set user information of the social application contact B into a first user information set;

(2) second information adopted for the second information prompting manner: the first terminal equipment randomly generates the second information when user A does not set the second information; and (3) a particular operation: the particular operation mentioned here is a clockwise swipe operation with a round trajectory on a second display interface.

Figure 2C:
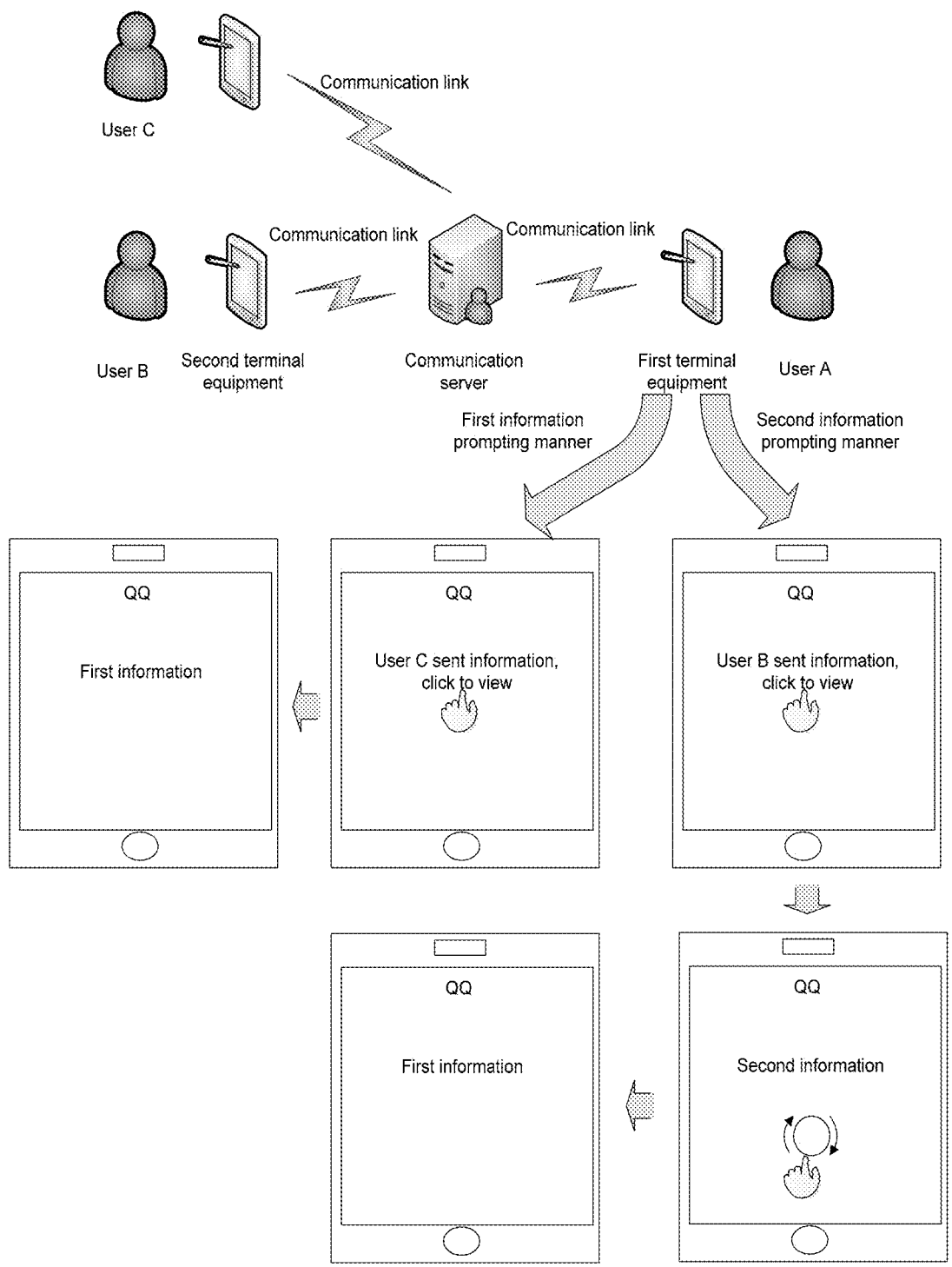
FIG. 2C is a scenario diagram of information prompting according to an embodiment of the disclosure.

As shown in FIG. 2C, the social application runs in the first terminal equipment of user A, and the first terminal equipment accesses a network through Wireless Fidelity (Wi-Fi). When a social application communication server on a network side transmits communication data, first information carried in the communication data, source user information (which is set to be information of user B and may be identified by the social application number of user B) of the communication data and target user information (corresponding to user A) of the communication data are analysed. The first terminal equipment detects that the user information of user B is matched with user information in the first user information set, the first information is prompted in the second information prompting manner, the second information (different from the first information) from user B is presented in the second display interface, and the first information from user B is presented when the second display interface receives the particular operation (the clockwise swipe operation with the round trajectory). In such a manner, when it is inconvenient for user A to view the first information from user B, the particular operation may not be implemented, and at this moment, the first terminal equipment may prompt that there is information to be viewed (for example, the information to be viewed is prompted in a form of displaying a corner mark on an icon of the social application).

The social application runs in the first terminal equipment of user A, and the first terminal equipment accesses the network in a Wi-Fi manner. When the social application communication server on the network side transmits communication data, first information carried in the communication data, a source (which is set to be user C and may be identified by a social application number of user C) of the communication data and target user information (corresponding to user A) of the communication data are analysed. The first terminal equipment detects that user information of user C is mismatched with the user information in the first user information set, and then the first information is prompted in a first information prompting manner, and the first information from user C is presented on a first display interface.

Figure 3A:
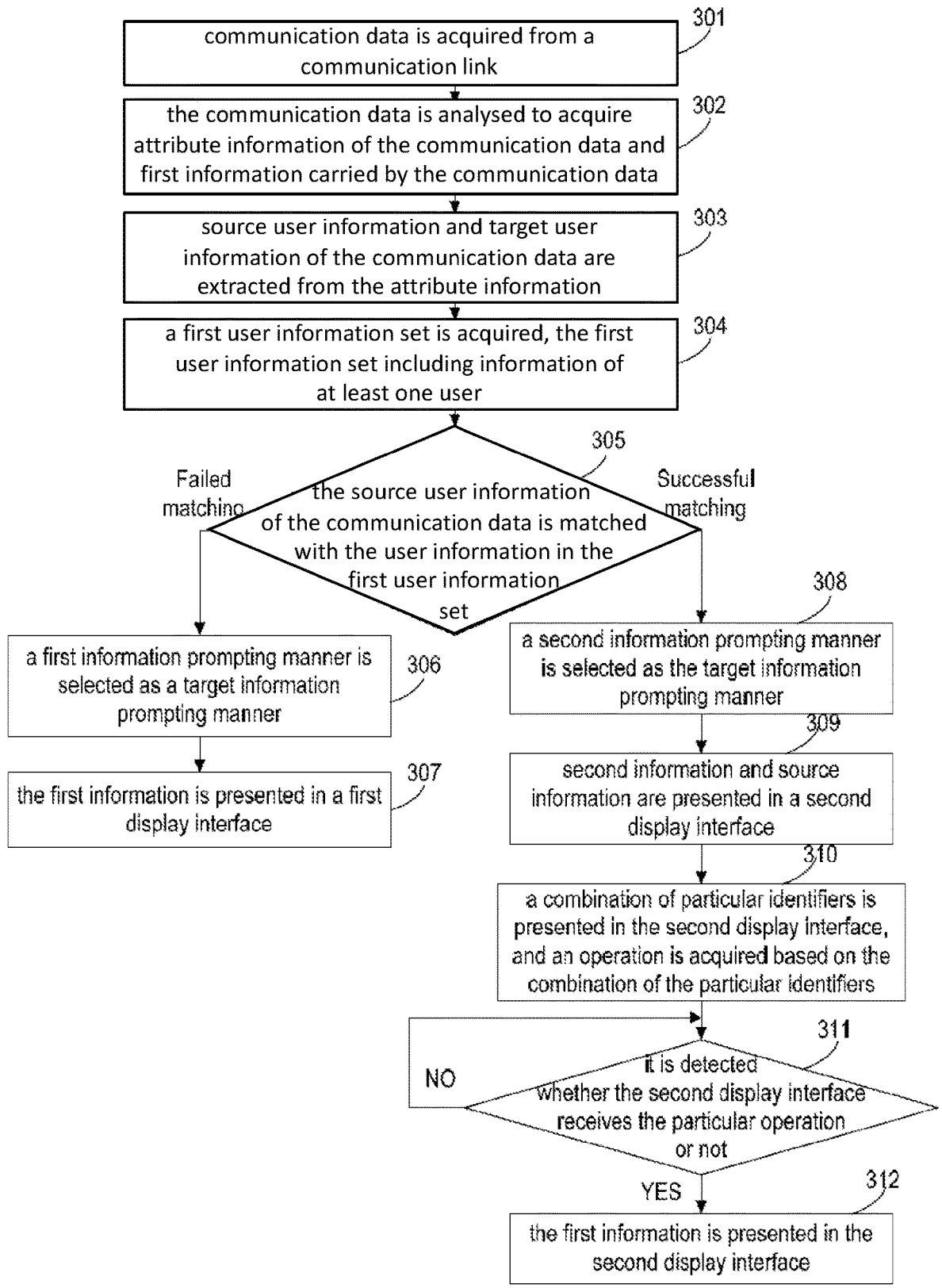
FIG. 3A is a yet another implementation flowchart showing an information processing method according to an embodiment of the disclosure.

An embodiment is directed to an information processing method, which may be applied to terminal equipment. As shown in FIG. 3A, the information processing method provided by the embodiment includes the following steps.

Step 301: communication data is acquired from a communication link.

The communication link mentioned here is a data transmission channel based on the following data connections: a fibre channel data connection; a cable data connection; a PSTN data connection; an IEEE 802.3 and IEEE 802.11b/g/n-based network connection, a powerline, a cable and a PSTN; and an IP network connection supported by a communication network such as 3GPP and 3GPP2 networks.

Step 302: the communication data is analysed to acquire attribute information of the communication data and first information carried by the communication data.

Step 303: source user information and target user information of the communication data are extracted from the attribute information.

Based on different types of the communication data, the source user information and the target user information may adopt a unique identifier of a user. For example, when the communication data is communication data of a social application, the source user information and the target user information may adopt a social application number; and when the communication data is communication data of a short message of a mobile phone, the source user information and the target user information may adopt the mobile phone number.

Step 304: a first user information set is acquired, the first user information set including information of at least one user.

In the embodiment, it is discussed that the target user information indicates that the communication data has only one target user.

Step 305: the source user information of the communication data is matched with the user information in the first user information set, Step 306 and Step 307 are executed in case of failed matching, and Step 308 and Step 309 are executed in case of successful matching.

Step 306: a first information prompting manner is selected as a target information prompting manner.

Step 307: the first information is presented in a first display interface.

In Step 307, it is implemented that the first information prompting manner is adopted as the target information prompting manner. That is, the first information is directly presented in the first display interface, so that the user may timely acquire the first information. The first display interface mentioned here may be a full window or non-full window in the terminal equipment.

Step 308: a second information prompting manner is selected as the target information prompting manner.

Step 309: second information and source information are presented in a second display interface.

In Step 309, it is implemented that the first information is prompted in the second information prompting manner. That is, reception of the first information is prompted by means of the second information different from the first information. For example, when the first information is bank account information, the second information may correspondingly be any information such as "hello" different from the first information. Therefore, the effect of prompting the user of the terminal equipment that the first information sent by a user in the first user information set is received with the first information not directly presented is achieved.

Step 310: a combination of identifiers is presented in the second display interface, and operation is acquired based on the combination of the identifiers.

Step 311: it is detected whether an identifier sequence triggered by the operation is matched with a pre-set identifier sequence or not, Step 312 is executed if YES, otherwise detection is continued until the second display interface is triggered to be closed or switched to a background.

For example, a sequence of nine identifiers (identifiers may be numbers, letters or the like) may be presented in form of Sudoku, and only when an identifier sequence triggered by the operation is matched with the pre-set identifier sequence (i.e. a pre-set password), Step 312 is executed to present the first information; and in a password verification manner, presenting security of the first information is guaranteed.

In Step 310 and Step 311, operations of detecting the operation received in the second display interface and performing authentication are executed. When an identifier sequence of the operation implemented by the user of the terminal equipment is matched with the pre-set identifier sequence (such as a password formed by numbers or letters), it is indicated that the operation passes authentication and the first information may be presented. During a practical application, Step 310 and Step 311 may be replaced with the following steps that it is detected whether the second display interface receives particular operation or not, Step 312 is executed if the particular operation is received, otherwise it is continued to be detected whether the particular operation is received or not until the second display interface is triggered to be closed or switched to a background. Here, the particular operation may be a particular point touch operation (such as a single-point touch operation and a multipoint touch operation) implemented on the second display interface, and may also be a particular swipe touch operation with a particular trajectory (such as a circle and a triangle).

Step 312: the first information is presented in the second display interface.

It is noted that the technical solution provided by the embodiment may be applied to any application with a point-to-point communication function such as WeChat and a social application, and subsequent descriptions are all made with reference to a particular application scenario in which a social application is taken as an example, which should not be considered as a limit to an application scenario of the embodiment of the disclosure.

It is assumed that user A sets the following information of a social application contact, i.e. user B, through a social application setting interface in first terminal equipment:

(1) information from user B (which may be identified by a social application number of user B) is prompted in a second information prompting manner, and the first terminal equipment is triggered to set user information of social application user B into a first user information set;

(2) second information adopted for the second information prompting manner: the second information may be randomly generated when user A does not set the second information; and (3) a particular operation: the particular operation mentioned here is a swipe operation implemented in an identifier sequence (which may be a Sudoku filled with numbers) presented in a second display interface, and a password corresponding to identifiers triggered by the swipe operation is 1235789.

Figure 3B:
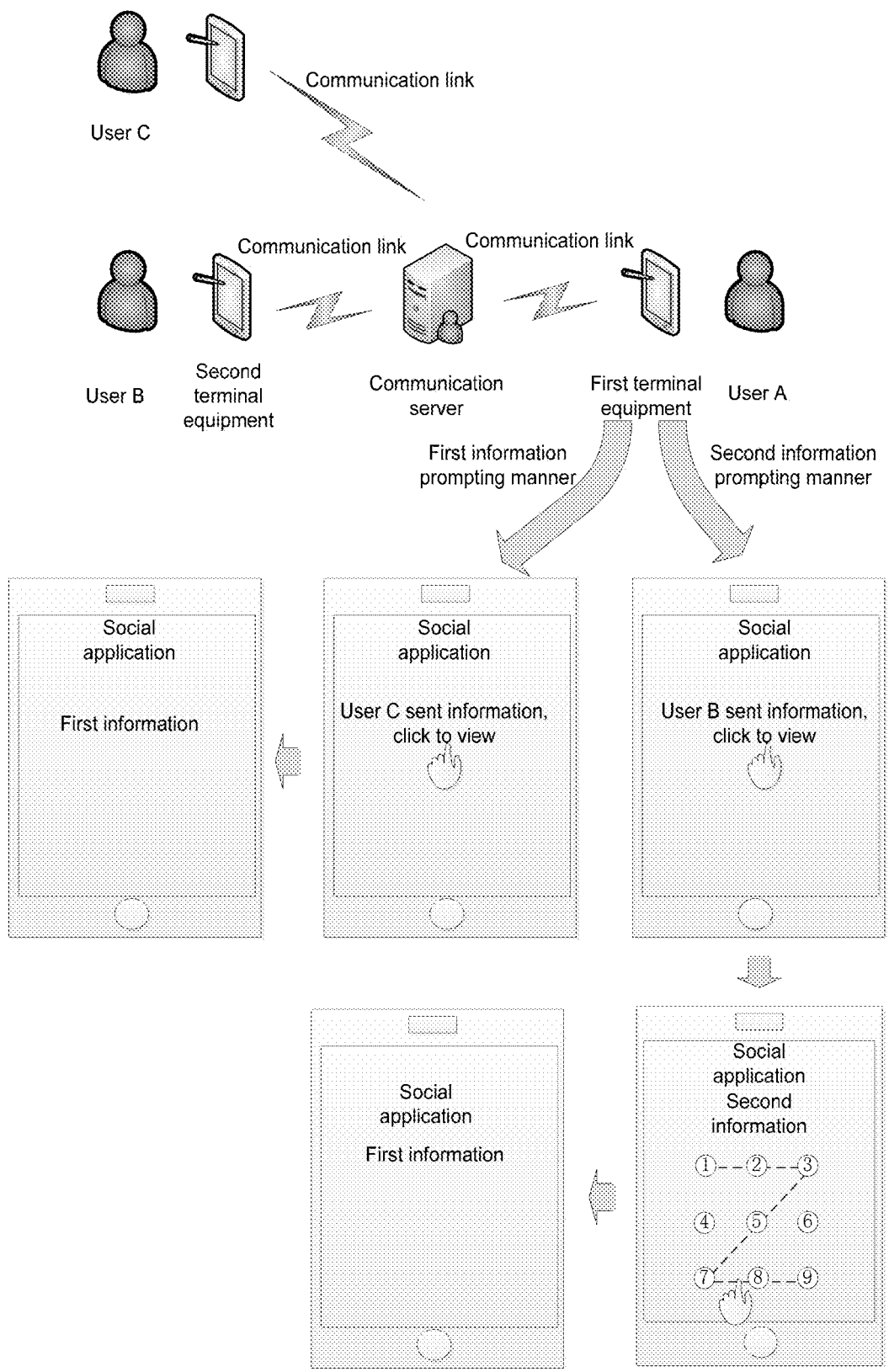
FIG. 3B is yet another scenario diagram of information prompting according to an embodiment of the disclosure.

As shown in FIG. 3B, the social application runs in the first terminal equipment of user A, and the first terminal equipment accesses a network through Wi-Fi. When a social application communication server on a network side transmits communication data, first information carried in the communication data, source user information (which is set to be information of user B and may be identified by the social application number of user B) of the communication data and target user information (corresponding to user A) of the communication data are analysed. The first terminal equipment detects that the user information of user B is matched with user information in the first user information set, the first information is prompted in the second information prompting manner, the second information (different from the first information) from user B and an unlocking interface formed by the identifier sequence are presented in the second display interface, the first information from user B is presented when the second display interface receives the particular operation (a trajectory of the particular operation passes by identifiers 1235789). In such a manner, when it is inconvenient for user A to view the first information from user B, the particular operation may not be implemented, and at this moment, the first terminal equipment may prompt that there is information to be viewed (for example, the information to be viewed is prompted in a form of displaying a corner mark on an icon of the social application).

The social application runs in the first terminal equipment of user A, and the first terminal equipment accesses the network through the Wi-Fi. When the social application communication server on the network side transmits communication data, first information carried in the communication data, source user information (which is set to be information of user C and may be identified by a social application number of user C) of the communication data and target user information (which corresponds to user A and may also be identified by a social application number of user A) of the communication data are analysed. The first terminal equipment detects that the user information of user C is mismatched with the user information in the first user information set, and then the first information is prompted in a first information prompting manner, and the first information from user C is presented on a first display interface.

Figure 4A:
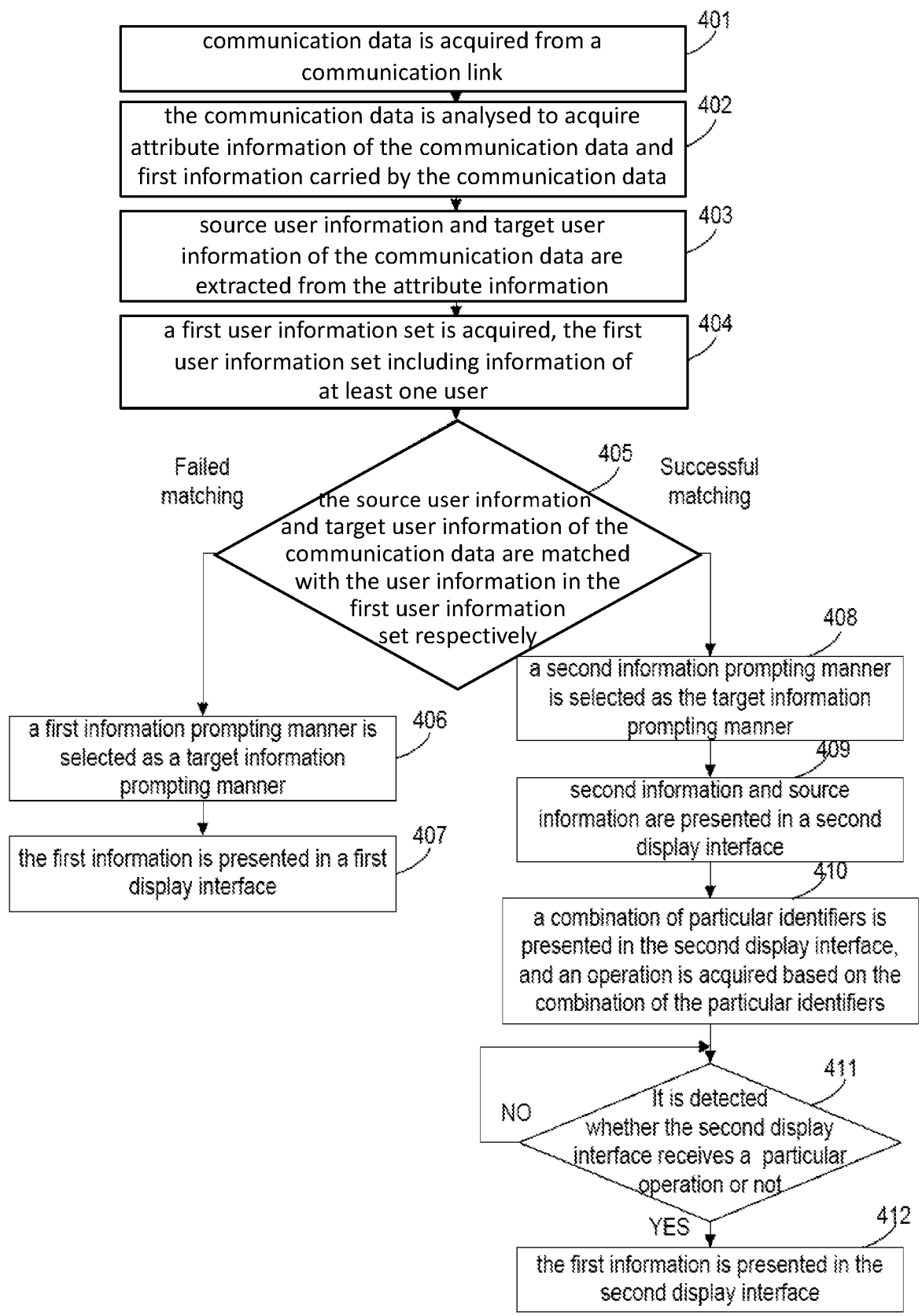
FIG. 4A is still another implementation flowchart showing an information processing method according to an embodiment of the disclosure.

An embodiment is directed to an information processing method, which may be applied to terminal equipment. As shown in FIG. 4A, the information processing method provided by the embodiment includes the following steps.

Step 401: communication data is acquired from a communication link.

The communication link mentioned here is a data transmission channel based on the following data connections: a fibre channel data connection; a cable data connection; a PSTN data connection; an IEEE 802.3 and IEEE 802.11b/g/n-based network connection, a powerline, a cable and a PSTN; and an IP network connection supported by a communication network such as 3GPP and 3GPP2 networks.

Step 402: the communication data is analysed to acquire attribute information of the communication data and first information carried by the communication data.

Step 403: source user information and target user information of the communication data are extracted from the attribute information.

Step 404: a first user information set is acquired, the first user information set including information of at least one user.

In the embodiment, it is discussed that the target user information indicates that the communication data has two target users.

Step 405: the source user information and target user information of the communication data are matched with the user information in the first user information set respectively, Step 406 and Step 407 are executed in case of failed matching, and Step 408 and Step 409 are executed in case of successful matching (that is, the source user information and the target user information are both matched with the user information in the first user information set).

The first user information set in the embodiment defaults to include user information of a user corresponding to terminal equipment which receives the communication data. For example, for first terminal equipment of user A, a first user information set stored by the first terminal equipment defaults to include user information of user A.

When the target user information indicates that the communication data has at least two target users, it is indicated that the first information carried by the communication data is generated during multipoint communication. For example, under the condition that the first terminal equipment of user A runs a social application, when a social application message (corresponding to the first information) received by the first terminal equipment is a group message, it is indicated that the message is required to be sent to each user except a message sending user in a group. At this moment, if user information of the users except the user (i.e. user A) corresponding to the first terminal equipment in the group is all matched with the user information in the first user information set, that is, the first user information set includes all user information of the users except the user (i.e.

user A) corresponding to the first terminal equipment in the group, it is necessary to prompt the first information in a second information prompting manner to guarantee presenting security of the first information. If the user information of part of the users in the users except the user (i.e. user A) corresponding to the first terminal equipment in the group is matched with the user information in the first user information set, it is unnecessary to prompt the first information in the second information prompting manner, and the first information is prompted in a first information prompting manner, that is, the first information is directly presented, which will be described by subsequent steps.

Step 406: a first information prompting manner is selected as a target information prompting manner.

Step 407: the first information is presented in a first display interface.

In Step 407, it is implemented that the first information prompting manner is adopted as the target information prompting manner. That is, the first information is directly presented in the first display interface, so that the user may timely acquire the first information. The first display interface mentioned here may be a full window or non-full window in the terminal equipment.

Step 408: a second information prompting manner is selected as the target information prompting manner.

Step 409: second information and source information are presented in a second display interface.

In Step 409, it is implemented that the first information is prompted in the second information prompting manner. That is, reception of the first information is prompted by means of the second information different from the first information. For example, when the first information is bank account information, the second information may correspondingly be any information such as "hello" different from the first information. Therefore, the effect of prompting the user of the terminal equipment that the first information sent by a user in the first user information set is received with the first information not directly presented is achieved.

Step 410: a combination of particular identifiers is presented in the second display interface, and operation is acquired based on the combination of the particular identifiers.

Step 411: it is detected whether an identifier sequence triggered by the operation is matched with a pre-set identifier sequence or not, Step 412 is executed if YES, otherwise detection is continued until the second display interface is triggered to be closed or switched to a background.

For example, a sequence of nine identifiers (identifiers may be numbers, letters or the like) may be presented in form of Sudoku, and only when an identifier sequence triggered by the operation is matched with the pre-set identifier sequence (i.e., a pre-set password), Step 412 is executed to present the first information; and in a password verification manner, presenting security of the first information is guaranteed.

Step 412: the first information is presented in the second display interface.

In Step 410 and Step 411, operations of detecting the operation received in the second display interface and performing authentication are executed. When an identifier sequence of the operation implemented by the user of the terminal equipment is matched with the pre-set identifier sequence (such as a password formed by numbers or letters), it is indicated that the operation passes authentication and the first information may be presented. During a practical application, Step 410 and Step 411 may be replaced with the following steps that it is detected whether the second display interface receives particular operation or not, Step 412 is executed if the particular operation is received, otherwise it is continued to be detected whether the particular operation is received or not until the second display interface is triggered to be closed or switched to a background. Here, the particular operation may be a particular point touch operation (such as a single-point touch operation and a multipoint touch operation) implemented on the second display interface, and may also be a particular swipe touch operation with a particular trajectory (such as a circle and a triangle).

It is noted that the technical solution provided by the embodiment may be applied to any application with a point-to-point communication function, and subsequent descriptions are all made with reference to a particular application scenario in which a social application is taken as an example, which should not be considered as a limit to an application scenario of the embodiment of the disclosure.

It is assumed that user A sets the following information of social application contacts, i.e. user B and user C, through a social application setting interface in first terminal equipment:

(1) information from user B and user C (which may be identified by a social application number of user B and a social application number of user C, the social application number of user B is configured to uniquely represent user B during social-application-based communication, and the social application number of user C is configured to uniquely represent user C during social-application-based communication) is prompted in a second information prompting manner, and the first terminal equipment is triggered to set user information of user A and user B and user information of user C into a first user information set (the user information of user A defaults to be set in the first user information set);

(2) second information adopted for the second information prompting manner: the second information may be randomly generated when user A does not set the second information; and (3) a particular operation: the particular operation mentioned here is a swipe operation implemented in an identifier sequence (which may be a Sudoku filled with numbers) presented in a second display interface, and a password corresponding to identifiers triggered by the swipe operation is 1235789.

Figure 4B:
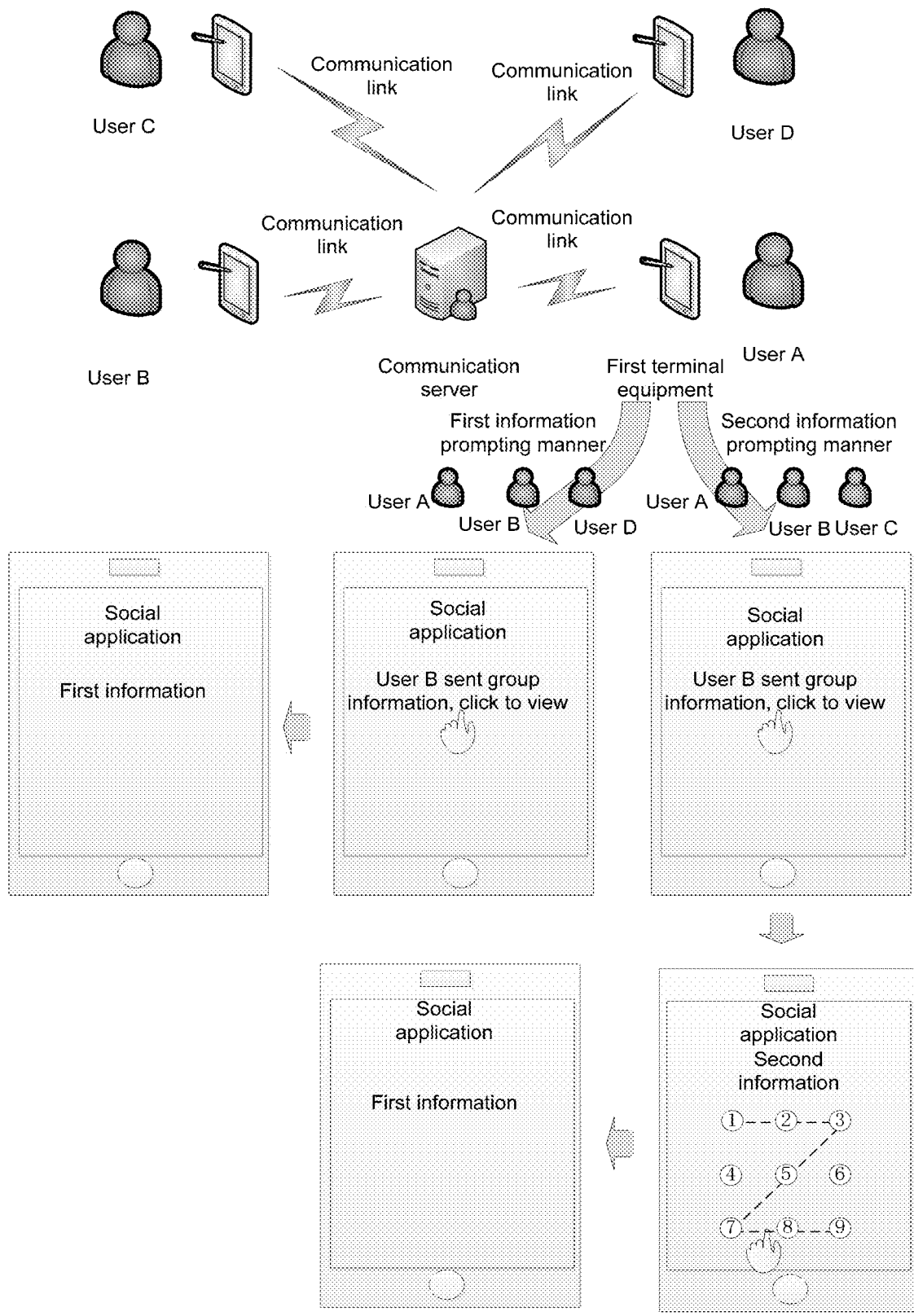
FIG. 4B is a still another scenario diagram of information prompting according to an embodiment of the disclosure.

As shown in FIG. 4B, a social application runs in the first terminal equipment of user A, and the first terminal equipment accesses a network through Wi-Fi. When a social application communication server on a network side transmits communication data, first information carried in the communication data, source user information (which is set to be information of user B and may be identified by the social application number of user B) of the communication data and target user information (which is set to be information of user A and user C and may be identified by social application numbers of user A and user C) of the communication data are analysed. The first terminal equipment detects that the source user information (the user information of user B) and target user information (i.e. the user information of user A and user C) of the communication data are both matched with the user information in the first user information set, the first information is prompted in the second information prompting manner, the second information (different from the first information) from user B and an unlocking interface formed by the identifier sequence are presented in the second display interface, the first information from user B is presented when the second display interface receives the particular operation (a trajectory of the particular operation passes by identifiers 1235789). In such a manner, when it is inconvenient for user A to view the first information from user B, the particular operation may not be implemented, and at this moment, the first terminal equipment may prompt that there is information to be viewed (for example, the information to be viewed is prompted in a form of displaying a corner mark on an icon of the social application).

The social application runs in the first terminal equipment of user A and the first terminal equipment accesses the network through the Wi-Fi. When the social application communication server on the network side transmits communication data, first information carried in the communication data, source user information (which is set to be the information of user B and may be identified by the social application number of user B) of the communication data and target user information (which is set to be information of user A and user D and may be identified by social application numbers of user A and user D) of the communication data are analysed. The first terminal equipment detects that the source user information (the user information of user B) and target user information (i.e. the user information of user A and user D) of the communication data are not completely matched with the user information in the first user information set, and then the first information is prompted in a first information prompting manner, and the first information from user C is presented on a first display interface, so that user A may timely acquire the information.

Figure 5:
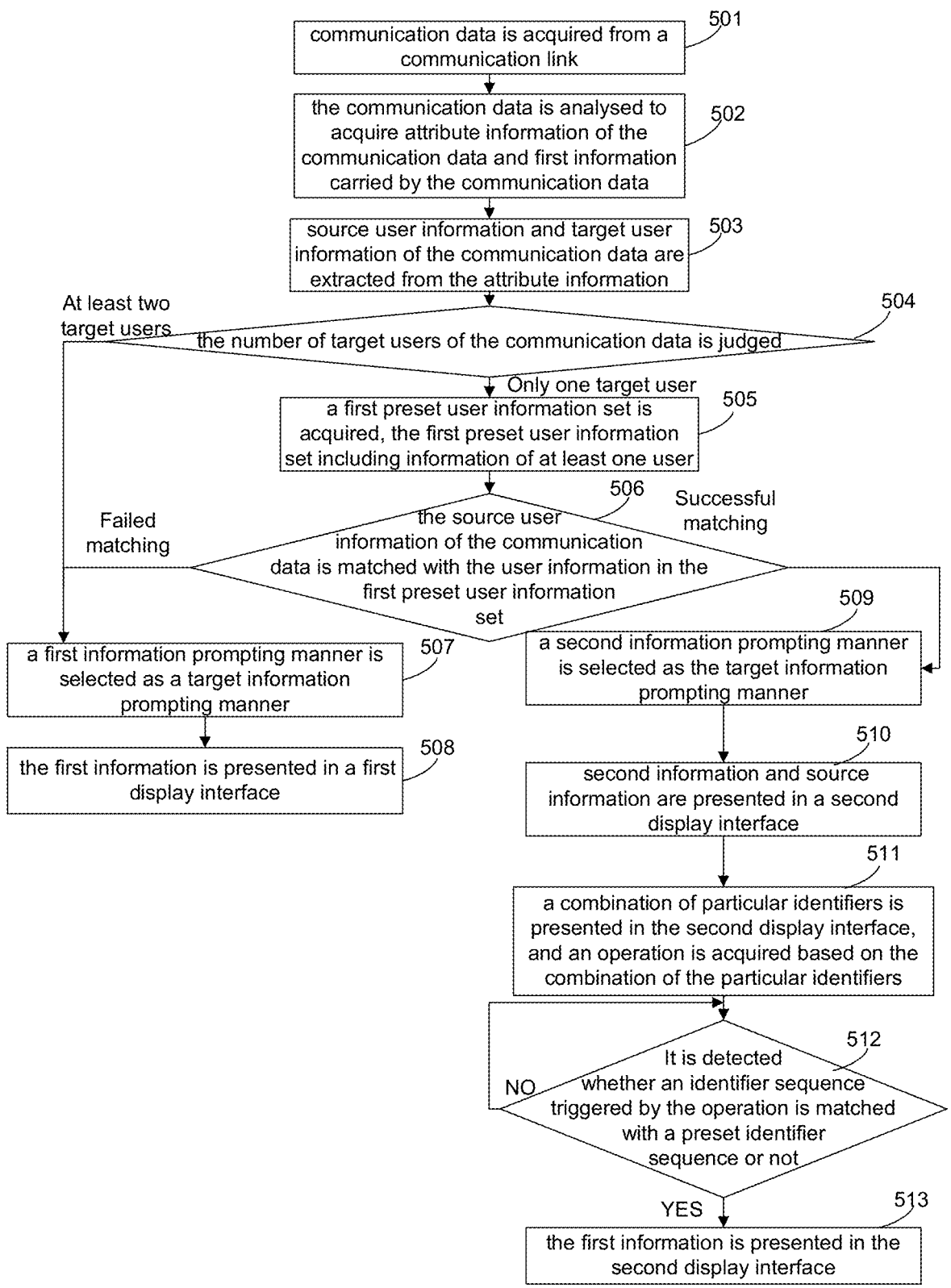
FIG. 5 is another implementation flowchart showing an information processing method according to an embodiment of the disclosure.

An embodiment is directed to an information processing method, which may be applied to terminal equipment. As shown in FIG. 5, the information processing method provided by the embodiment includes the following steps.

Step 501: communication data is acquired on the basis of a communication link.

The communication link mentioned here is a data transmission channel based on the following data connections: a fibre channel data connection; a cable data connection; a PSTN data connection; an IEEE 802.3 and IEEE 802.11b/g/n-based network connection, a powerline, a cable and a PSTN; and an IP network connection supported by a communication network such as 3GPP and 3GPP2 networks.

Step 502: the communication data is analysed to acquire attribute information of the communication data and first information carried by the communication data.

Step 503: source user information and target user information of the communication data are extracted from the attribute information.

Based on different types of the communication data, the source user information and the target user information may adopt a unique identifier of a user. For example, when the communication data is communication data of a social application, the source user information and the target user information may adopt a social application number. When the communication data is communication data of a short message of a mobile phone, the source user information and the target user information may adopt the mobile phone number.

Step 504: the number of target users of the communication data is judged, Step 505 and Step 506 are executed when the target user information indicates that the communication data has only one target user, and Step 507 and Step 508 are executed when the target user information indicates that the communication data has at least two target users.

When the target user information indicates that the communication data has only one target user, it is indicated that the first information carried by the communication data is generated during point-to-point communication. For example, for a social application, when a social application message (corresponding to the first information) is a point-to-point message, it is indicated that the social application message is required to be sent to only one user. At this moment, if source user information of the social application message is matched with user information in a first user information set (the user information in the pre-set user information set may be pre-set in the terminal equipment), it is indicated that the first information is required to be prompted in a second prompting manner to guarantee presenting security of the first information, which will be described by subsequent steps.

When the target user information indicates that the communication data has at least two target users, it is indicated that the first information carried by the communication data is generated during multipoint communications. For example, for the social application, when the social application message (corresponding to the first information) is a group message, the message is required to be sent to each user in a group. At this moment, even though user information of the users in the group is matched with the user information in the first user information set, it is unnecessary to prompt the first information in the second information prompting manner. Instead, a first information prompting manner is adopted for the group message in the embodiment, that is, the group message is directly presented.

Step 505: a first user information set is acquired, the first user information set including information of at least one user.

In the embodiment, the first user information set in the embodiment defaults to include user information of a user corresponding to terminal equipment which receives the communication data. For example, for first terminal equipment of user A, a first user information set stored by the first terminal equipment defaults to include user information of user A.

Step 506: the source user information of the communication data is matched with the user information in the first user information set, Step 507 and Step 508 are executed in case of failed matching, and Step 509 is executed in case of successful matching.

When the target user information indicates that the communication data has only one target user, it is indicated that the first information carried by the communication data is generated during point-to-point communication. For example, for the social application, when a social application message (corresponding to the first information) is a point-to-point message, it is indicated that the social application message is required to be sent to only one user. At this moment, if source user information of the social application message is matched with the user information in the first user information set, it is indicated that the first information is required to be prompted in the second prompting manner to guarantee the presenting security of the first information, which will be described by subsequent steps.

Step 507: a first information prompting manner is selected as a target information prompting manner.

Step 508: the first information is presented in a first display interface.

In Step 508, it is implemented that the first information prompting manner is adopted as the target information prompting manner. That is, the first information is directly presented in the first display interface, so that the user may timely acquire the first information. The first display interface mentioned here may be a full window or non-full window in the terminal equipment.

Step 509: a second information prompting manner is selected as the target information prompting manner.

Step 510: second information and source information are presented in a second display interface.

In Step 510, it is implemented that the first information is prompted in the second information prompting manner. That is, reception of the first information is prompted by means of the second information different from the first information. For example, when the first information is bank account information, the second information may correspondingly be any information such as "hello" different from the first information. Therefore, the effect of prompting the user of the terminal equipment that the first information sent by a user in the first user information set is received is achieved, the first information is not directly presented, and the problem that the first information is leaked when the first information is directly presented is solved.

Step 511: a combination of particular identifiers is presented in the second display interface, and an operation is acquired based on the combination of the particular identifiers.

Step 512: it is detected whether an identifier sequence triggered by the operation is matched with a pre-set identifier sequence or not, Step 513 is executed if YES, otherwise detection is continued until the second display interface is triggered to be closed or switched to a background.

For example, a sequence of nine identifiers (identifiers may adopt numbers, letters or the like) may be presented in form of Sudoku, and only when a sequence triggered by the operation is matched with the pre-set identifier sequence (i.e. a pre-set password), Step 513 is executed to present the first information. In a password verification manner, presenting security of the first information is guaranteed.

In Step 511 and Step 512, the operations of detecting the operation received in the second display interface and performing authentication are executed. When an identifier sequence of the operation implemented by the user of the terminal equipment is matched with the pre-set identifier sequence (such as a password formed by numbers or letters), it is indicated that the operation passes authentication and the first information may be presented. During a practical application, Step 511 and Step 512 may be replaced with the following steps that it is detected whether the second display interface receives particular operation or not, Step 513 is executed if the particular operation is received, otherwise whether the particular operation is received or not is continued to be detected until the second display interface is triggered to be closed or switched to a background. Here, the particular operation may be a particular point touch operation (such as a single-point touch operation and a multipoint touch operation) implemented on the second display interface, and may also be a particular swipe touch operation with a particular trajectory (such as a circle and a triangle).

Step 513: the first information is presented in the second display interface.

It is noted that the technical solution provided by the embodiment may be applied to any application with a point-to-point communication function.

Figure 6A:
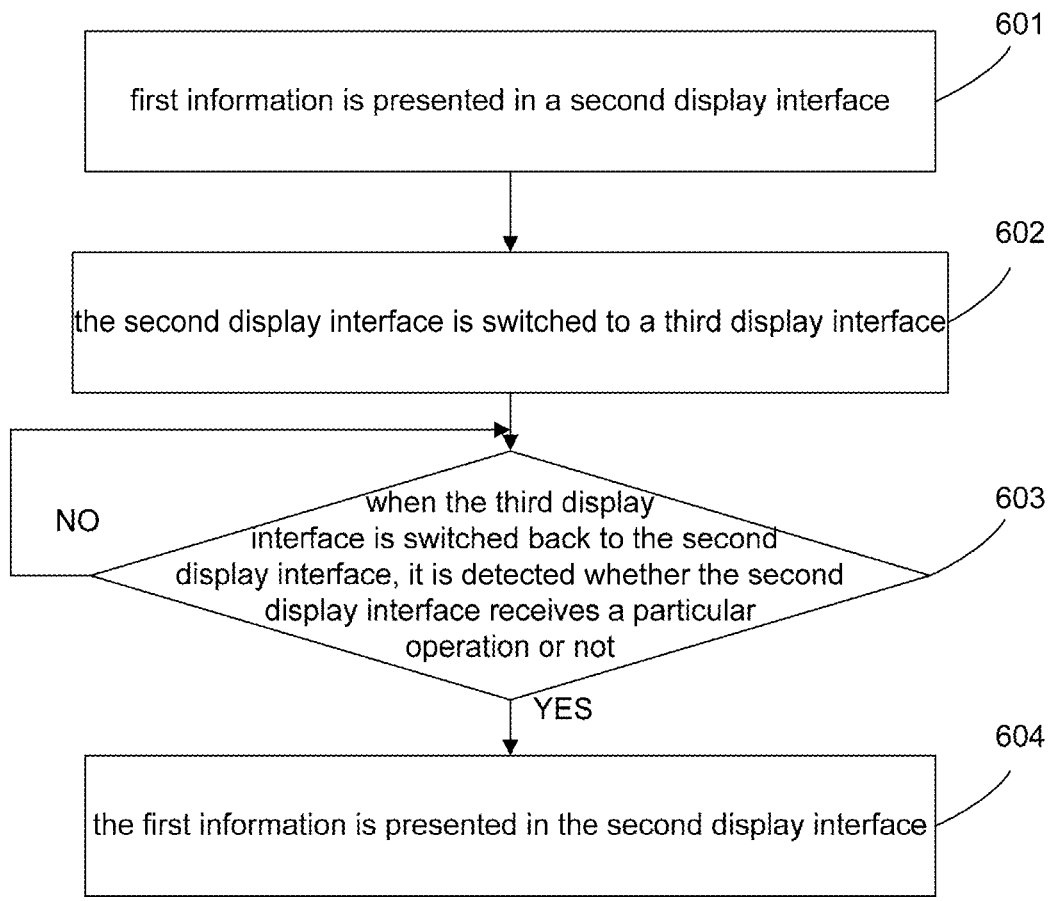
FIG. 6A is another implementation flowchart showing an information processing method according to an embodiment of the disclosure.

An embodiment is directed to an information processing method, which may be applied to terminal equipment. It is further described in the embodiment to prompt first information in a second information prompting manner by the terminal equipment. As shown in FIG. 6A, the information processing method provided by the embodiment includes the following steps.

Step 601: terminal equipment presents second information in a second display interface, and presents first information when the second display interface receives a particular operation.

The first information is information carried by communication data received by the terminal equipment, and the second information is any information (which may be pre-set in the terminal equipment during a practical application) different from the first information. The particular operation may be a particular point touch operation (such as a single-point touch operation or a multipoint touch operation) implemented in the second display interface, and may also be an operation received to trigger identifiers after the second display interface displays an identifier sequence, and the sequence of the identifiers triggered by the received operation is matched with a pre-set identifier sequence (the identifiers may be numbers, letters or the like).

Step 602: the second display interface is switched to a third display interface.

In Step 602, processing executed during display interface operation controlled by a user is implemented. For example, the user may switch to a display interface of another application (corresponding to the third display interface, i.e. a display interface not configured to display the first information and the second information, such as a display interface of a multimedia application) after viewing the first information presented in a display interface of a social application (corresponding to the second display interface). Here, the second display interface and the third display interface may adopt a form of full window or non-full window, which is not limited in the embodiment.

Step 603: when the third display interface is switched back to the second display interface, it is detected whether the particular operation is received in the second display interface or not, Step 604 is executed if YES, otherwise detection is continued until the second display interface is triggered to be closed or switched to a background.

Step 604: the first information is presented in the second display interface.

Since it is necessary to guarantee security of the first information presented in the second display interface, after the terminal equipment presents the first information in the second display interface, if the second display interface is subsequently switched to the background (for example, covered by the third display interface or closed), the user is required to implement the particular operation in the second display interface again to verify legality of the user to guarantee the security of the information.

Figure 6B:
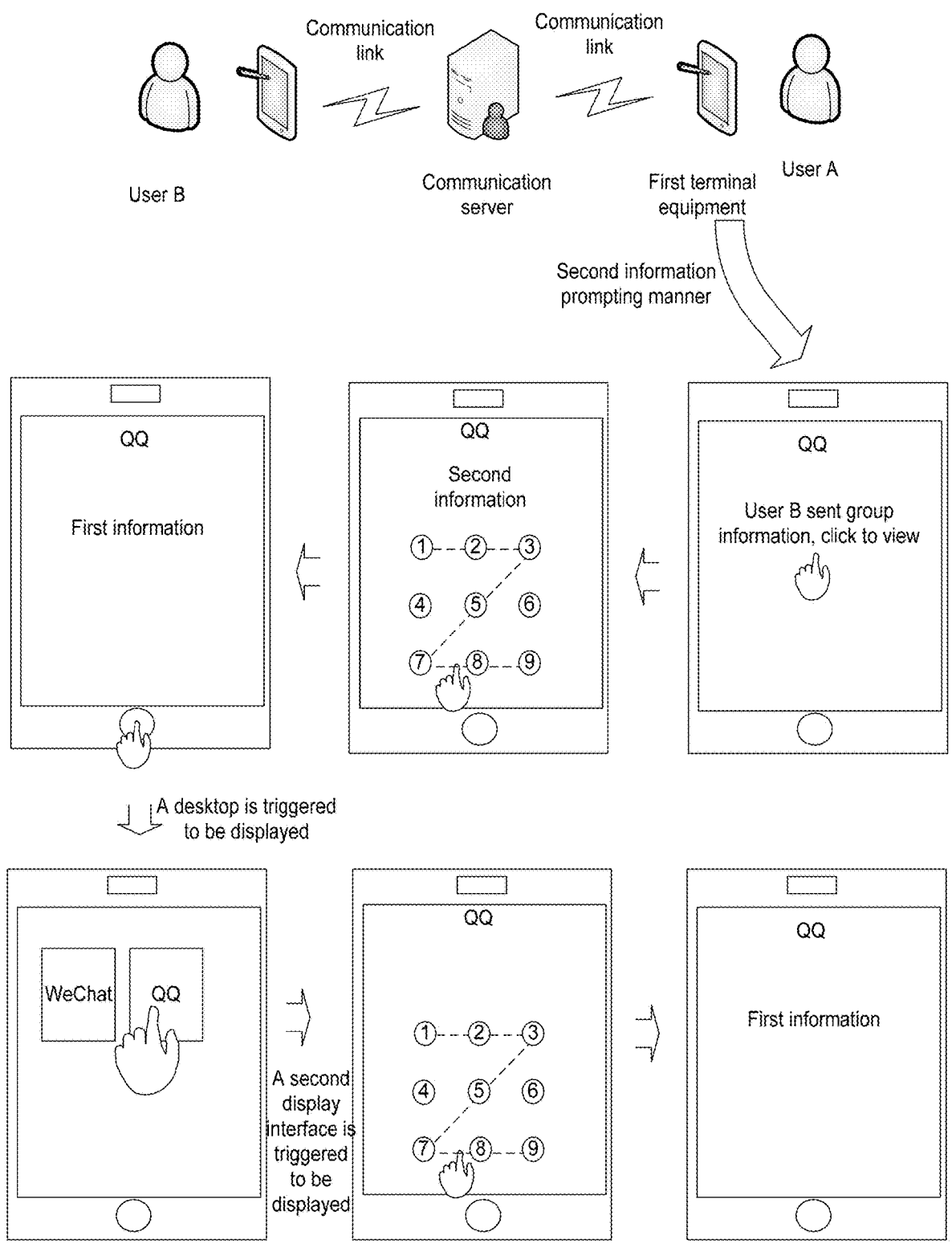
FIG. 6B is a scenario diagram of information prompting according to an embodiment of the disclosure.

FIG. 6B is a scenario diagram in which a social application (including QQ and WeChat) runs in terminal equipment of user A, and the terminal equipment accesses a network through Wi-Fi. When a QQ communication server on a network side transmits communication data, first information carried in the communication data and a source user, i.e. user B, of the communication data are analysed. When the first information sent by user B is prompted in a second information prompting manner, second information (different from the first information, the second information may be pre-set or randomly generated) from user B is presented in a second display interface for user A to timely receive the information sent by user B, and the first information is presented when a particular operation (identifiers by which an operating trajectory of the operation passes correspond to a pre-set identifier sequence) is received in a combination of particular identifiers (a form of Sudoku filled with numbers in FIG. 6B).

When user A triggers the first terminal equipment to switch to a third display interface (such as a desktop or an interface different from the social application), the first terminal equipment switches the second display interface to a background for display (at this moment, the second display interface is covered by the third display interface) or may close the second display interface. When the user triggers switching back to the second display interface, since the first information is prompted in the second display interface in the second information prompting manner to guarantee the presenting security of the information, the first information is presented when the particular operation (the identifiers by which the operating trajectory of the operation pass correspond to the pre-set identifier sequence) is received in the combination of the particular identifiers (the form of Sudoku filled with numbers in the figure) in the second display interface so as to prevent the information from leaking.

Figure 7A:
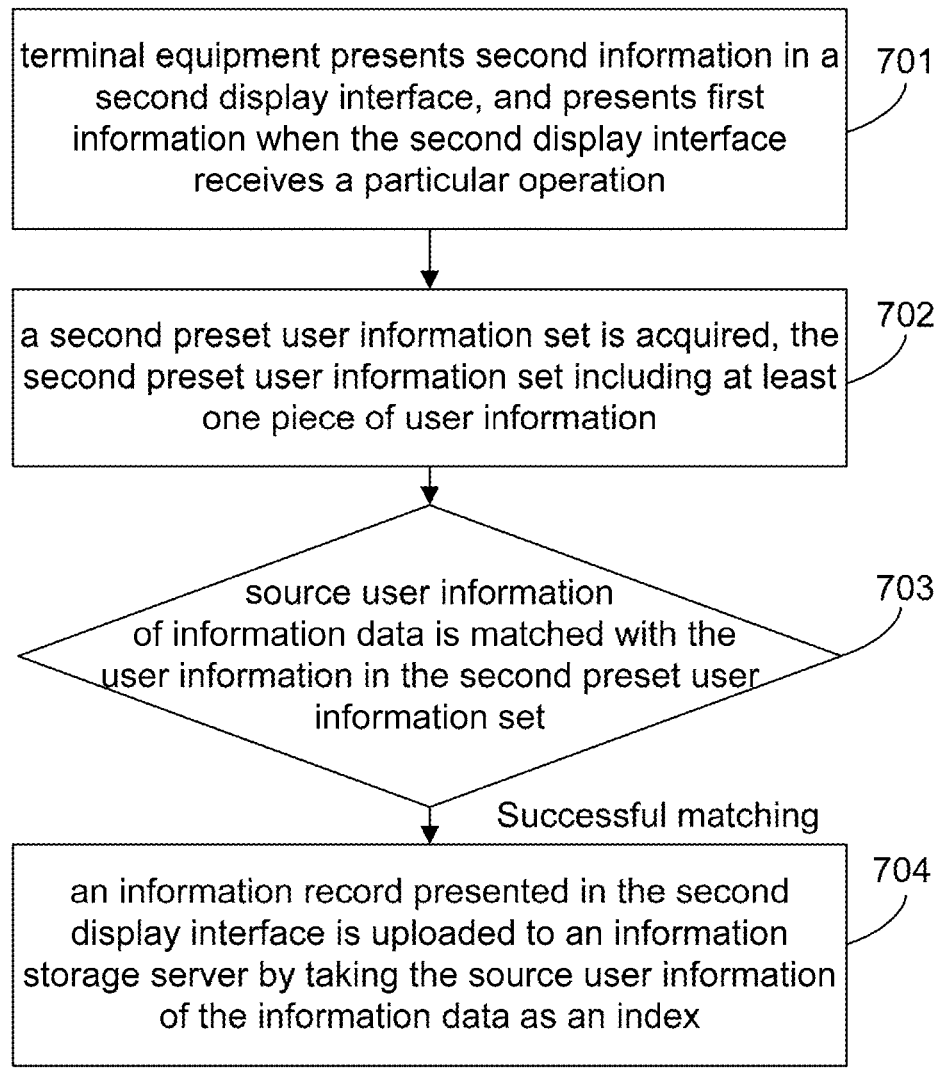
FIG. 7A is another implementation flowchart showing an information processing method according to an embodiment of the disclosure.

An embodiment is directed to an information processing method, which may be applied to terminal equipment. It is further described in the embodiment to prompt first information in a second information prompting manner by the terminal equipment. As shown in FIG. 7A, the information processing method provided by the embodiment includes the following steps.

Step 701: terminal equipment presents second information in a second display interface, and presents first information when the second display interface receives a particular operation.

The first information is information carried by communication data received by the terminal equipment. When a particular condition is met, the terminal equipment prompts the first information in a second information prompting manner different from a first information prompting manner (the first information is presented in a first display interface). That is, the second information is presented in the second display interface, and the first information is presented when the second display interface receives a particular operation, wherein the particular condition may be one of the following conditions:

(1) target user information analysed from the communication data indicates that the communication data has only one target user, and source user information analysed from the communication data is matched with user information in a first user information set; and (2) the target user information analysed from the communication data indicates that the communication data has at least two target users, and the source user information and target user information analysed from the communication data are matched with the user information in the first user information set respectively.

The second information is any information (which may be pre-set in the terminal equipment during a practical application) different from the first information. The particular operation may be a particular point touch operation (such as a single-point touch operation or a multipoint touch operation) implemented in the second display interface, and may also be an operation received to trigger identifiers after the second display interface displays an identifier sequence, and the sequence of the identifiers triggered by the received operation is matched with a pre-set identifier sequence (the identifiers may adopt numbers, letters or the like).

Step 702: a second user information set is acquired, the second user information set including information of at least one user.

The second user information set may be the same as the first user information set, and may also be different (two groups of different user information may be set in the terminal equipment respectively).

Step 703: it is judged whether source user information of communication data is matched with the user information in the second user information set, Step 704 is executed in case of successful matching, otherwise processing is stopped.

Step 704: an information record presented in the second display interface is uploaded to an information storage server by taking the source user information of the communication data as an index.

Herein, the information record is configured for a communication server to respond to an information record acquisition request from the terminal equipment. For example, a user may upload an information record in a second display interface (such as a chatting interface with a particular user in a social application) of own first terminal equipment to the information storage server by taking source user information (corresponding to an information sender in the social application) as an index. Subsequently, the user may request the information storage server for the information record through second terminal equipment (for example, the information storage server is requested to roam the information record to the second terminal equipment in the social application), and the second terminal equipment may judge legality of the user according to whether the particular operation is received or not when requesting the information storage server to roam the information record.

Figure 7B:
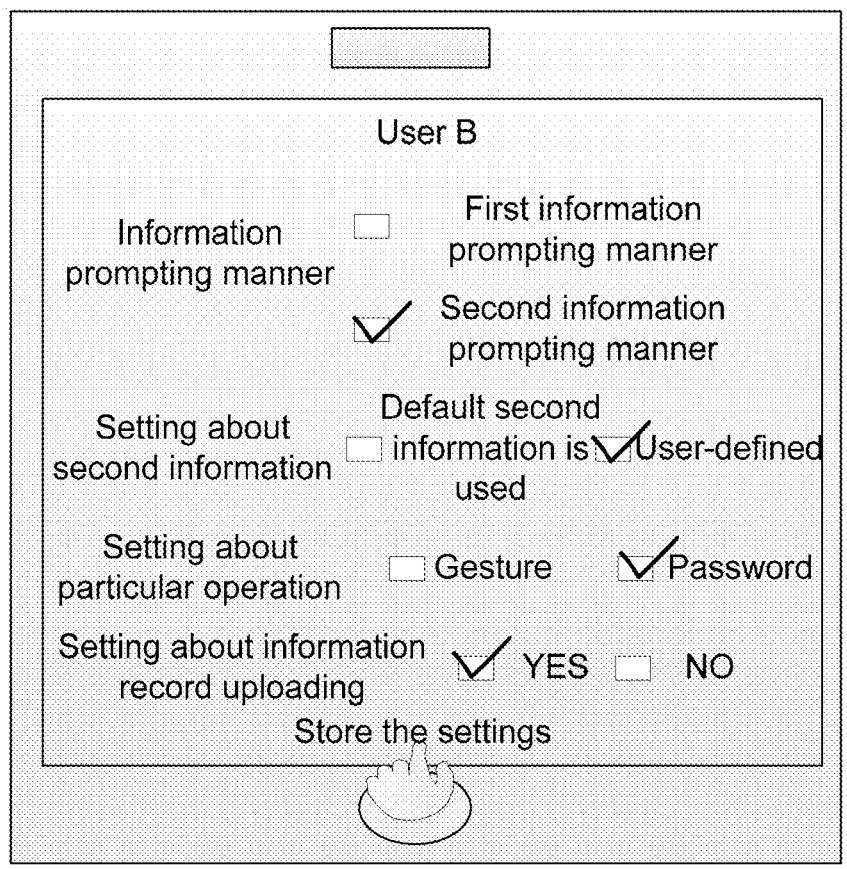
FIG. 7B is another diagram of setting an information prompting manner according to an embodiment of the disclosure.

As shown in FIG. 7B, it is assumed that user A sets the following information of a social application contact, i.e. user B, through a social application setting interface in the first terminal equipment:

(1) information from user B (which may be identified by a social application number of user B) is prompted in a second information prompting manner, and the first terminal equipment is triggered to set user information of user A and user C into a first user information set (the user information of user A defaults to be set in the first user information set);

(2) second information adopted for the second information prompting manner, wherein the second information may be randomly generated when user A does not set the second information;

(3) a particular operation: the particular operation mentioned here is a swipe operation implemented in an identifier sequence (which may be a Sudoku filled with numbers) presented in the second display interface, and a password corresponding to identifiers triggered by the swipe operation is 1235789; and (4) information record uploading: when it is set to be YES, the first terminal equipment is triggered to upload an information record corresponding to user B to the information storage server.

Figure 7C:
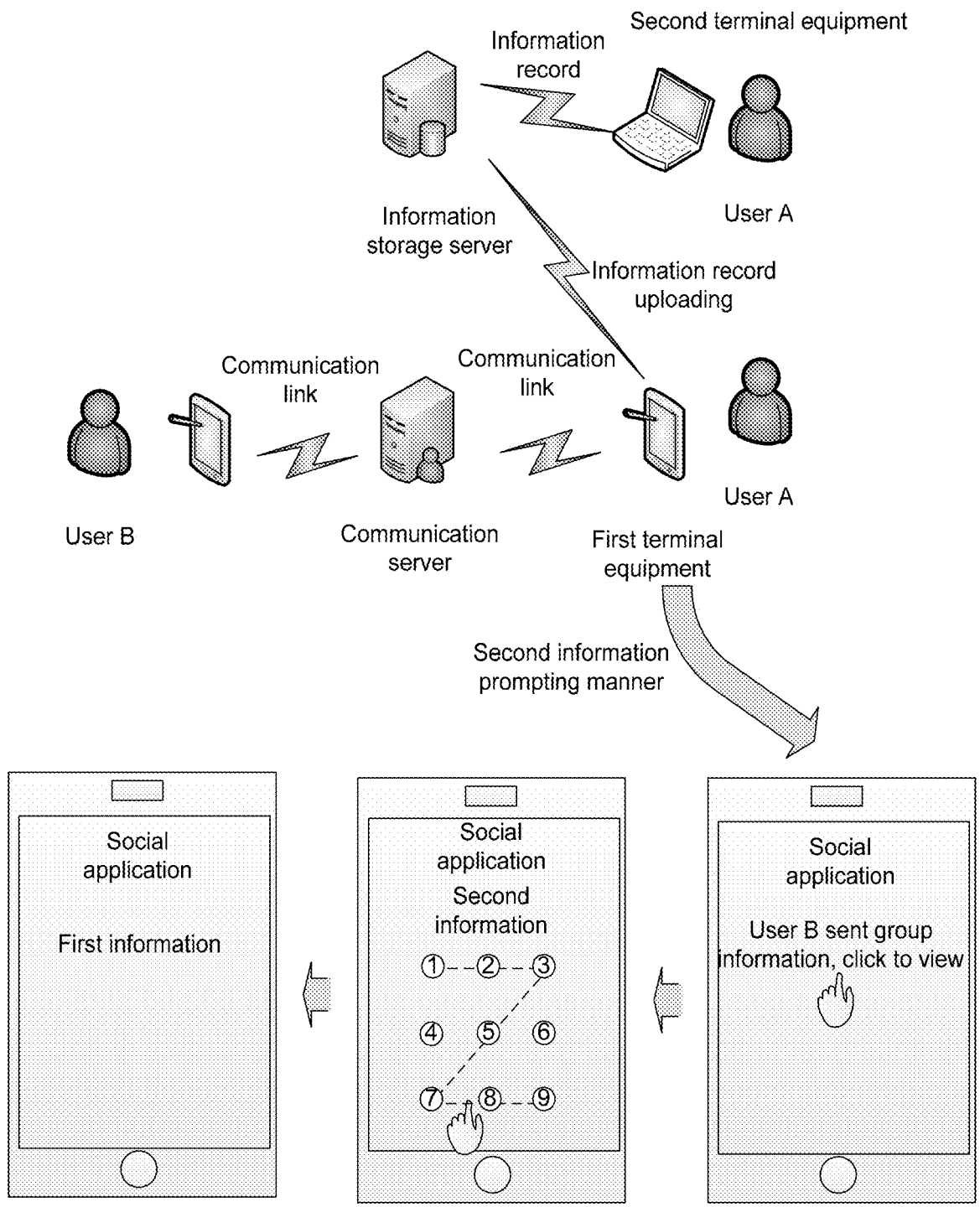
FIG. 7C is a scenario diagram of information prompting according to an embodiment of the disclosure.

FIG. 7C is a scenario diagram in which when the social application runs in the first terminal equipment of user A, and the first terminal equipment accesses a network through Wi-Fi. When a social application communication server on a network side transmits communication data, first information carried in the communication data, source user information (which is set to be information of user B and may be identified by the social application number of user B) of the communication data and target user information (of user A) of the communication data are analysed, the first terminal equipment detects that the source user information (the user information of user B) of the communication data is matched with the user information in the first user information set, the first information is prompted in the second information prompting manner, the second information (different from the first information) from user B and an unlocking interface formed by the identifier sequence are presented in the second display interface, and the first information from user B is presented when the second display interface receives the particular operation (a trajectory of the particular operation passes by identifiers 1235789). In such a manner, when it is inconvenient for user A to view the first information from user B, the particular operation may not be implemented. At this moment, the first terminal equipment may prompt that there is information to be viewed (for example, the information to be viewed is prompted in a form of displaying a corner mark on an icon of the social application).

The first terminal equipment uploads an information record presented in the second display interface to the information storage server. When the second terminal equipment of user A runs the social application and requests the information storage server for the information record corresponding to user B, the information storage server may transmit the information record corresponding to user B to the second terminal equipment. When the user requests the information storage server for the information record corresponding to user B through the second terminal equipment, the second terminal equipment may perform legality verification on user A by means of the particular operation set in the first terminal equipment by user A (information of the particular operation may be sent to the second terminal equipment by the first terminal equipment through the communication server).

Figure 8A:
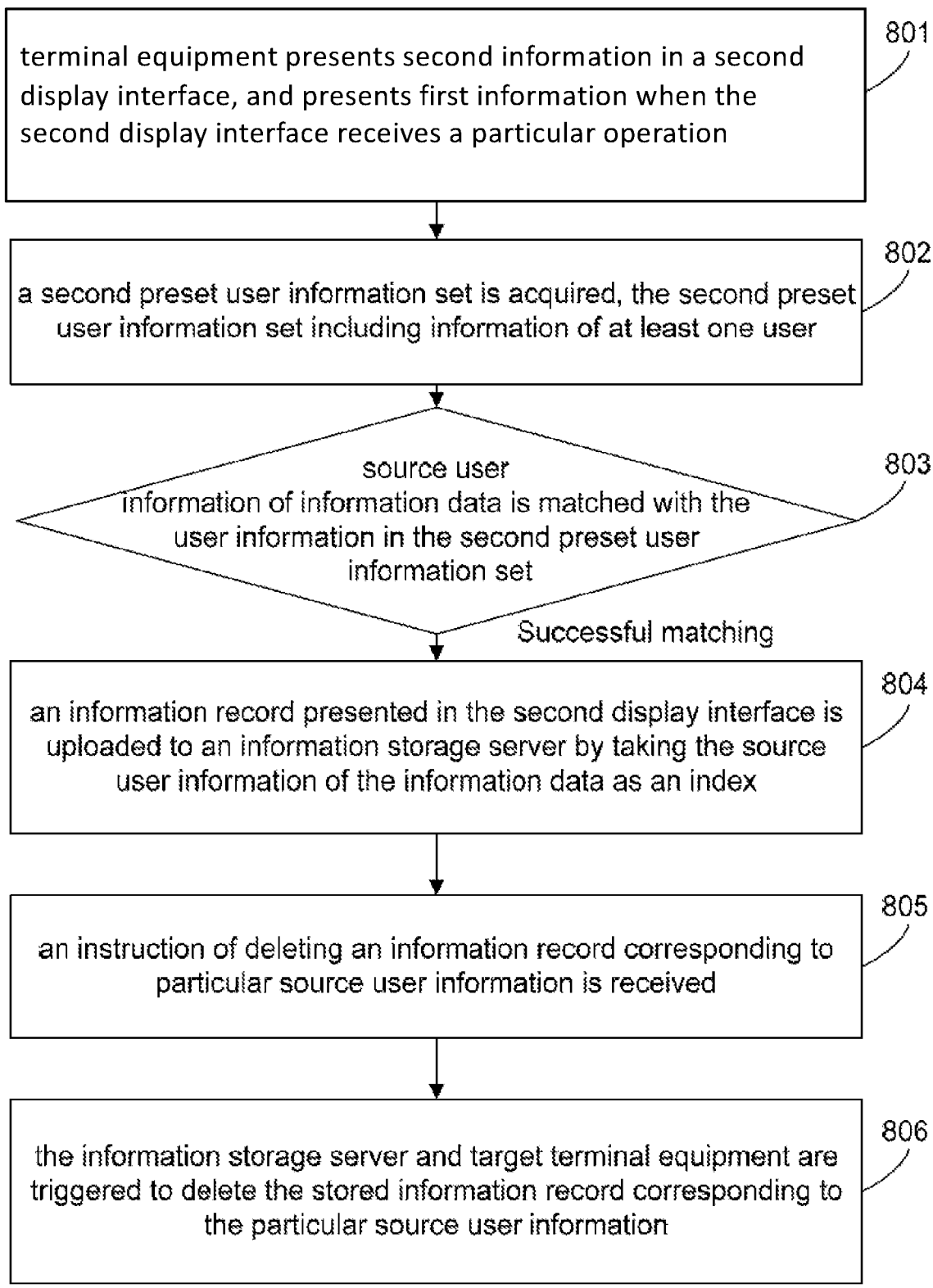
FIG. 8A is another implementation flowchart showing an information processing method according to an embodiment of the disclosure.

An embodiment is directed to an information processing method, which may be applied to terminal equipment. It is further described in the embodiment processing implemented to prompt first information in a second information prompting manner by the terminal equipment. As shown in FIG. 8A, the information processing method provided by the embodiment includes the following steps.

Step 801: terminal equipment presents second information in a second display interface, and presents first information when the second display interface receives a particular operation.

The first information is information carried by communication data received by the terminal equipment. When a particular condition is met, the terminal equipment prompts the first information in a second information prompting manner different from a first information prompting manner (the first information is presented in a first display interface). That is, the second information is presented in the second display interface, and the first information is presented when the second display interface receives a particular operation, wherein the particular condition may be one of the following conditions:

(1) target user information analysed from the communication data indicates that the communication data has only one target user, and source user information analysed from the communication data is matched with user information in a first user information set; and (2) the target user information analysed from the communication data indicates that the communication data has at least two target users, and the source user information and target user information analysed from the communication data are matched with the user information in the first user information set respectively.

The second information is any information (which may be pre-set in the terminal equipment during a practical application) different from the first information. The particular operation may be a particular point touch operation (such as a single-point touch operation or a multipoint touch operation) implemented in the second display interface, and may also be an operation received to trigger identifiers after the second display interface displays an identifier sequence, and the sequence of the identifiers triggered by the received operation is matched with a pre-set identifier sequence (the identifiers may adopt numbers, letters or the like).

Step 802: a second user information set is acquired, the second user information set including information of at least one user.

The second user information set may be the same as the first user information set, and may also be different (two groups of different user information may be set in the terminal equipment respectively).

Step 803: it is judged whether source user information of communication data is matched with the user information in the second user information set, Step 804 is executed in case of successful matching, otherwise processing is stopped.

Step 804: an information record presented in the second display interface is uploaded to an information storage server by taking the source user information of the communication data as an index.

The information record is configured for the information storage server to respond to an information record acquisition request from other terminal equipment. For example, a user may upload an information record in a second display interface (such as a chatting interface with a particular user in a social application) of own first terminal equipment to the information storage server by taking source user information (corresponding to an information sender in the social application) as an index. Subsequently, user A may request the information storage server for the information record through second terminal equipment (for example, the information storage server is requested to roam the information record to the second terminal equipment in the social application), and the second terminal equipment may judge legality of the user according to whether the particular operation is received or not when requesting the information storage server to roam the information record.

Step 805: an instruction of deleting an information record corresponding to particular source user information is received.

For example, for the social application, user A may trigger deletion of a chatting record with a particular contact in a chatting record management interface of the social application.

Step 806: the information storage server and target terminal equipment are triggered to delete the stored information record corresponding to the particular source user information.

Figure 8B:
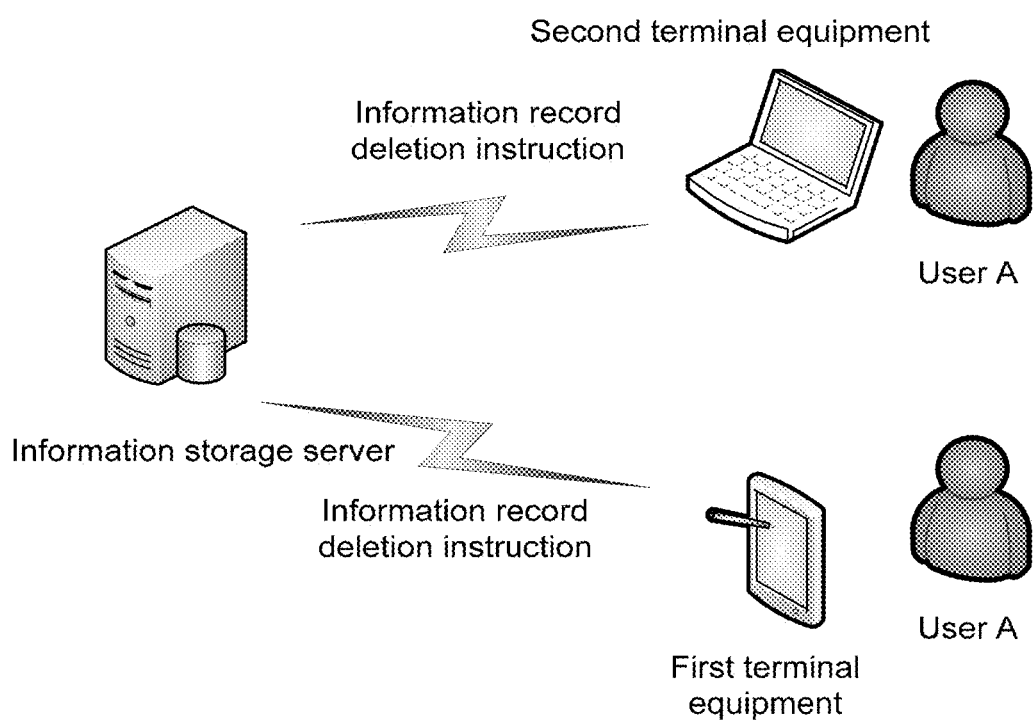
FIG. 8B is a scenario diagram of deleting information record according to an embodiment of the disclosure.

As shown in FIG. 8B, when the user triggers the first terminal equipment to delete the stored information record corresponding to the particular source user information, the first terminal equipment may send an information record deletion instruction to the second terminal equipment of user A through the information storage server; and the information record stored by the information storage server and the target terminal equipment (corresponding to the second terminal equipment) is deleted, so that the risk that the information record corresponding to the particular source user information is leaked is avoided.

An embodiment is directed to a computer-readable medium, which may be a Read-Only Memory (ROM) (such as a ROM, a FLASH memory and a transfer device), a magnetic storage medium (such as a magnetic tape and a disk drive), an optical storage medium (such as a Compact Disc Read-Only Memory (CD-ROM), a Digital Video Disk Read-Only Memory (DVD-ROM), a paper card and a paper tape) and program memories of other known types. The computer-readable medium stores computer-executable instructions and the instructions are executed to cause at least one processor to execute the following operations of:

acquiring communication data on the basis of a communication link; analysing the communication data to acquire attribute information of the communication data and first information carried by the communication data; selecting a target information prompting manner from at least two information prompting manners based on the attribute information; and prompting the first information carried by the communication data in the target information prompting manner, wherein, when the first information is prompted in a first information prompting manner, the first information and source information are presented in a first display interface, and when the first information is prompted in a second information prompting manner, second information and the source information are presented in a second display interface, and the first information is presented when the second display interface receives a particular operation.

In an embodiment, the instructions are executed to cause the at least one processor to further execute the following operations of: presenting a combination of particular identifiers in the second display interface, and acquiring an operation based on the combination of the particular identifiers; and analysing whether a sequence of identifiers triggered by the operation is matched with a pre-set identifier sequence or not, and if YES, presenting the first information in the display interface.

In an embodiment, the instructions are executed to cause the at least one processor to further execute the following operations of: extracting source user information and target user information of the communication data from the attribute information; acquiring a first user information set, the first user information set including information of at least one user; and when the target user information indicates that the communication data has only one target user, matching the source user information of the communication data with the user information in the first user information set, selecting the second information prompting manner as the target information prompting manner in case of successful matching, and selecting the first information prompting manner as the target information prompting manner in case of failed matching.

In an embodiment, the instructions are executed to cause the at least one processor to further execute the following operations of: extracting source user information and target user information of the communication data from the attribute information; and when the target user information indicates that the communication data has at least two target users, matching the source user information and target user information of the communication data with the user information in the first user information set respectively, selecting the second information prompting manner as the target information prompting manner in case of successful matching, and selecting the first information prompting manner as the target information prompting manner in case of failed matching.

In an embodiment, the instructions are executed to cause the at least one processor to further execute the following operations of: extracting target user information of the communication data from the attribute information; and when the target user information indicates that the communication data has at least two target users, selecting the first information prompting manner as the target information prompting manner.

In an embodiment, the instructions are executed to cause the at least one processor to further execute the following operations of: switching the second display interface to a third display interface, and when the third display interface is switched back to the second display interface, detecting whether the second display interface receives the particular operation or not, and if YES, presenting the first information in the second display interface, wherein the third display interface is configured to display information different from the first information and the second information.

In an embodiment, the instructions are executed to cause the at least one processor to further execute the following operations of: when the first information is prompted in the second information prompting manner, acquiring a second user information set, the second user information set including information of at least one user; and matching the source user information of the communication data with the user information in the second user information set, and uploading an information record presented in the second display interface to an information storage server by taking the source user information of the communication data as an index in case of successful matching, wherein the information record is configured to respond to an information record acquisition request from terminal equipment.

In an embodiment, the instructions are executed to cause the at least one processor to further execute the following operations of: when an information record corresponding to particular source user information is deleted from information records stored by first electronic equipment, triggering the information storage server and the second electronic equipment to delete the stored information record corresponding to the particular source user information.

Figure 9A:
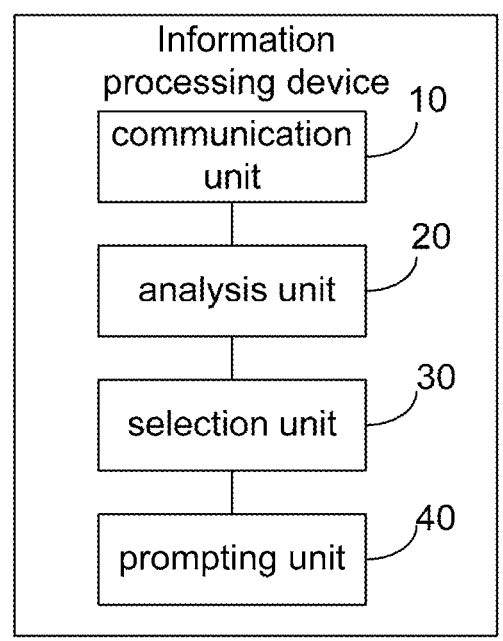
FIG. 9A is a first structure diagram illustrating an information processing device according to an embodiment of the disclosure.

An embodiment is directed to an information processing device, which may be applied to terminal equipment provided by the abovementioned embodiment to guarantee information presenting security of the terminal equipment. As shown in FIG. 9A, the information processing device provided by the embodiment includes:

a communication unit 10, configured to acquire communication data on the basis of a communication link;

an analysis unit 20, configured to analyse the communication data to acquire attribute information of the communication data and first information carried by the communication data;

a selection unit 30, configured to select a target information prompting manner from at least two information prompting manners based on the attribute information; and a prompting unit 40, configured to prompt the first information carried by the communication data in the target information prompting manner, wherein, when the first information is prompted in a first information prompting manner, the first information and source information are presented in a first display interface, and when the first information is prompted in a second information prompting manner, second information and the source information are presented in a second display interface, and the first information is presented when the second display interface receives a particular operation.

In an embodiment, the prompting unit 40 includes (not shown in the figure):

a presenting module 401, configured to present a combination of particular identifiers in the second display interface, and acquire an operation based on the combination of the particular identifiers; and an analysis module 402 (coupled with the presenting module 401), configured to analyse whether a sequence of identifiers triggered by the operation is matched with a pre-set identifier sequence or not, and if YES, trigger the presenting module to present the first information in the display interface.

In an embodiment, the selection unit 30 includes (not shown in the figure):

a first extraction module 301, configured to extract source user information and target user information of the communication data from the attribute information;

an acquisition module 302 (coupled with the first extraction module 301), configured to acquire a first user information set, the first user information set including information of at least one user; and a first matching module 303 (coupled with the acquisition module 302), configured to, when the target user information indicates that the communication data has only one target user, match the source user information of the communication data with the user information in the first user information set, select the second information prompting manner as the target information prompting manner in case of successful matching, and select the first information prompting manner as the target information prompting manner in case of failed matching.

In an embodiment, the selection unit 30 includes (not shown in the figure):

a second extraction module 304, configured to extract source user information and target user information of the communication data from the attribute information; and a second matching module 305 (coupled with the second extraction module 304), configured to, when the target user information indicates that the communication data has at least two target users, match the source user information and target user information of the communication data with the user information in the first user information set respectively, select the second information prompting manner as the target information prompting manner in case of successful matching, and select the first information prompting manner as the target information prompting manner in case of failed matching.

In an embodiment, the selection unit 30 includes (not shown in the figure):

a third extraction module 306, configured to extract target user information of the communication data from the attribute information; and a selection module 307 (coupled with the third extraction module 306), configured to, when the target user information indicates that the communication data has at least two target users, select the first information prompting manner as the target information prompting manner.

In an embodiment, the prompting unit 40 is further configured to switch the second display interface to a third display interface, and when the third display interface is switched back to the second display interface, detect whether the second display interface receives the particular operation or not, and if YES, present the first information in the second display interface, wherein the third display interface is configured to display information different from the first information and the second information.

Figure 9B:
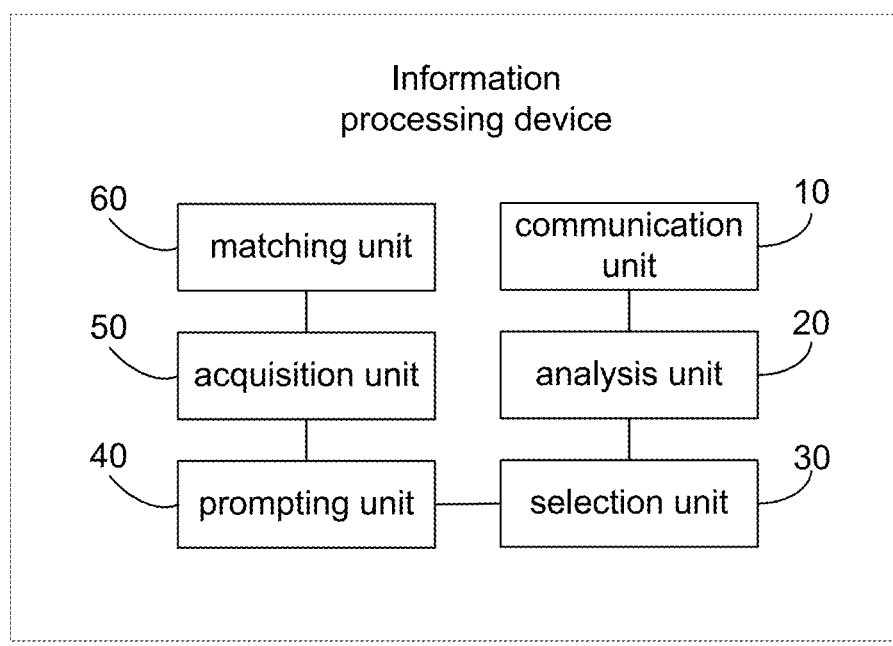
FIG. 9B is a second structure diagram illustrating an information processing device according to an embodiment of the disclosure.

In an embodiment, as shown in FIG. 9B, the information processing device further includes:

an acquisition unit 50, configured to, when the prompting unit 40 prompts the first information in the second information prompting manner, acquire a second user information set, the second user information set including information of at least one user; and a matching unit 60, configured to match the source user information of the communication data with the user information in the second user information set, and trigger the communication unit 10 to upload an information record presented in the second display interface to an information storage server by taking the source user information of the communication data as an index in case of successful matching, wherein the information record is configured to respond to an information record acquisition request from terminal equipment.

Figure 9C:
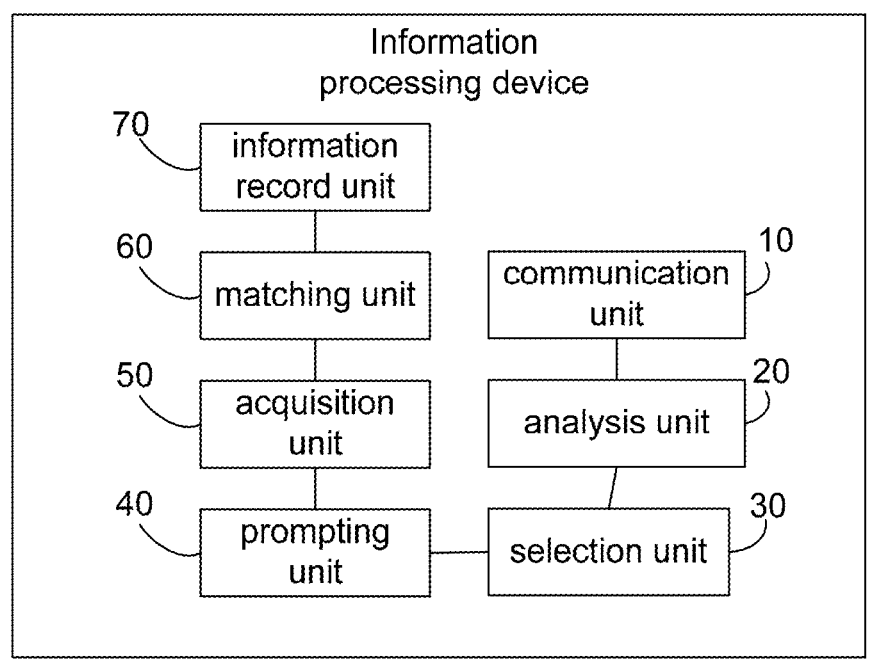
FIG. 9C is a third structure diagram illustrating an information processing device according to an embodiment of the disclosure.

In an embodiment, as shown in FIG. 9C, the information processing device further includes:

an information record unit 70, configured to, when an information record corresponding to particular source user information is deleted from information records stored by first electronic equipment, trigger the information storage server and the second electronic equipment to delete the stored information record corresponding to the particular source user information.

During a practical application, based on different communication links, the communication unit 10 may be implemented by integrated circuit chips supporting the corresponding communication links in the information processing device. For example, when a Wi-Fi-based communication link is used, the communication unit 10 may be implemented by a Wi-Fi radio frequency chip and Wi-Fi antennas; the analysis unit 20, the selection unit 30, the prompting unit 40, the acquisition unit 50 and the matching unit 60 may be implemented by a processing unit, such as a Micro Processing Unit (MCU), Field-Programmable Gate Array (FPGA) or Application Specific Integrated Circuit (ASIC) in the information processing device; and the information record unit 70 may be implemented by a non-volatile storage medium (such as a flash memory) in the information processing device combined with the MCU, the FPGA or the ASIC.

According to the above, the embodiments of the disclosure have the following beneficial effects.

(1) When it is determined that privacy of the first information carried by the communication data is not high (for example, it is allowed to be acquired by others) based on the attribute information of the communication data, the first information prompting manner may be adopted to prompt the first information. That is, the first information and the source information are presented in the first display interface, so that the user may timely acquire the information. When the attribute information of the communication data indicates that the privacy of the first information carried by the communication data is relatively higher (that is, the first information is forbidden to be acquired by others), the second information prompting manner may be adopted to prompt the first information. That is, the second information (different from the first information) and the source information are presented in the second display interface, and the first information is presented when the second display interface receives the particular operation. That is, reception of the first information is prompted by means of the second information, and the first information is not directly presented, so that the condition that the first information may be spied and stolen if the first information is directly presented is avoided, and the security of the information is effectively guaranteed.

(2) Before the first information is presented in the second information prompting manner, operation input in the display interface by the user is further verified (whether it is the pre-set particular operation or not). That is, security verification for viewing the first information is implemented, so that the presenting security of the information is further guaranteed.

(3) When the target users (one or more than one) of the communication data are all users in the pre-set user information set and users corresponding to dual-party (or multi-party) communication and participating in communication are all users in the pre-set user information set, the first information carried by the communication data is presented in the second information prompting manner, so that the presenting security of the information is guaranteed.

(4) When the source user information of the communication data is the user information in the pre-set user information set and the number of the target users of the communication data is more than or equal to 2, the users in the pre-set user information set correspondingly participate in multi-party communication, and at this moment, it is unnecessary to prompt the first information carried by the communication data in the second information prompting manner. Instead, the first information is directly presented in the display interface, so that the user can timely acquire the information.

(5) When the third display interface is triggered to be switched to the second display interface for display, since the second display interface is configured to prompt the first information carried by the communication data in the second information prompting manner, the first information carried by the communication data may be displayed only after the user implements the particular operation on the second display interface, so that the presenting security of the information is further improved.

(6) The first information presented in the second display interface may be processed according to whether the source user of the communication data is in the second user information set or not. It is indicated that the first information carried by the communication data may be uploaded to the information storage server for storage when the source user of the communication data is matched with the user information in the second user information set, otherwise it is indicated that the privacy of the first information carried by the communication data is high, and the first information is not uploaded to the information storage server for storage, so that the security of the information is enhanced.

(7) When the first information displayed in the second display interface of the first terminal equipment is roamed to the second terminal equipment, if the first terminal equipment is subsequently triggered to delete the first information, the first terminal equipment sends the instruction of deleting the information record to the second terminal equipment through the information storage server, so that the condition that other terminal equipment still stores the information record is avoided, and the security of the information is guaranteed.

Those skilled in the art should understand that all or part of the steps of the method embodiment may be implemented by related hardware instructed by a program, the program may be stored in a computer-readable storage medium, and the program is executed to execute the steps of the method embodiments. The storage medium includes: various media capable of storing program codes such as mobile storage equipment, a Random Access Memory (RAM), a ROM, a magnetic disk or a compact disc.

Alternatively, if implemented in form of software function module and sold or used as an independent product, the integrated unit of the disclosure may also be stored in a computer-readable storage medium. Based on such an understanding, the technical solutions of the embodiments of the disclosure substantially or a part with contributions to the related technology may be embodied in form of software product, and the computer software product is stored in a storage medium, including a plurality of instructions configured to enable a piece of computer equipment (which may be a personal computer, a server, network equipment, a wearable device or the like) to execute all or part of the method in each embodiment of the disclosure. The storage medium includes: various media capable of storing program codes such as mobile storage equipment, a RAM, a ROM, a magnetic disk or a compact disc.

The above is only the embodiments of the disclosure and not intended to limit the scope of protection of the disclosure, and any variations or replacements apparent to those skilled in the art within the technical scope disclosed by the disclosure shall fall within the scope of protection of the disclosure. Therefore, the scope of protection of the disclosure shall be in accordance with the claims.

The invention claimed is:

1. An information processing method, comprising:
acquiring, by a terminal equipment, communication data from a communication link;
analyzing, by the terminal equipment, the communication data, and acquiring attribute information of the communication data and first information carried by the communication data;
selecting, by the terminal equipment, a target information prompting manner from at least two information prompting manners including a first information prompting manner and a second information prompting manner, based on the attribute information;
prompting, by the terminal equipment, the first information carried by the communication data in the target information prompting manner;
when the target information prompting manner includes the first information prompting manner, presenting the first information and source information of the communication data on a first display interface; and
when the target information prompting manner includes the second information prompting manner, including:
presenting second information and the source information of the communication data on a second display interface, wherein the first information is information requiring prevention of leakage to unintended recipient, the second information is information not requiring prevention of leakage to unintended recipient, the first display interface is a display interface of the terminal equipment configured to display the first information, and the second display interface is a display interface of the terminal equipment configured to display the second information;
presenting the first information on the second display interface when the second display interface receives a particular operation, wherein the second information is different from the first information and configured to prompt receipt of the first information;
acquiring a second user information set, the second user information set including information of at least one user;
matching source user information of the communication data with the information of the at least one user in the second user information set; and
uploading an information record presented in the second display interface to an information storage server by taking the source user information of the communication data as an index in case of successful matching, wherein the information record is configured for the information storage server to respond to an information record acquisition request from the terminal equipment.

2. The method according to claim 1, wherein presenting the first information when the second display interface receives the particular operation comprises:
   presenting a combination of identifiers on the second display interface, and acquiring the particular operation based on the combination of the identifiers; and
   analyzing whether a sequence of the identifiers triggered by the particular operation is matched with a pre-set identifier sequence, and when the sequence of the identifiers triggered by the particular operation is matched with the pre-set identifier sequence, presenting the first information on the second display interface.

3. The method according to claim 1, wherein selecting the target information prompting manner from the at least two information prompting manners based on the attribute information comprises:
   extracting source user information and target user information of the communication data from the attribute information;
   acquiring a first user information set from the terminal equipment, the first user information set including information of at least one user;
   when the target user information indicates that the communication data is directed to only one target user, determining whether the source user information of the communication data is matched with the user information in the first user information set; and
      selecting the second information prompting manner as the target information prompting manner upon determination of a successful matching; and
      selecting the first information prompting manner as the target information prompting manner upon determination of an unsuccessful matching.

4. The method according to claim 1, wherein selecting the target information prompting manner from the at least two information prompting manners based on the attribute information comprises:
   extracting source user information and target user information of the communication data from the attribute information;
   acquiring a first user information set from the terminal equipment, the first user information set including information of at least one user;
   when the target user information indicates that the communication data is directed to at least two target users, determining whether the source user information and target user information of the communication data is matched with the information of the at least one user in the first user information set respectively; and
      selecting the second information prompting manner as the target information prompting manner upon determination of a successful matching; and
      selecting the first information prompting manner as the target information prompting manner upon determination of an unsuccessful matching.

5. The method according to claim 1, wherein selecting the target information prompting manner from the at least two information prompting manners based on the attribute information comprises:
   extracting target user information of the communication data from the attribute information; and
   when the target user information indicates that the communication data is directed to at least two target users, selecting the first information prompting manner as the target information prompting manner.

6. The method according to claim 1, further comprising:
   when the first information is prompted in the second information prompting manner, switching the second display interface to a third display interface, and when the third display interface is switched back to the second display interface, detecting whether the second display interface receives the particular operation, and when the second display interface receives the particular operation, presenting the first information in the second display interface, wherein the third display interface is configured to display information different from the first information or the second information.

7. The method according to claim 1, further comprising:
   when the information record is deleted from stored information records, triggering the information storage server and the terminal equipment to delete the information record.

8. An information processing device, comprising a memory and a processor coupled to the memory, the processor being configured to:
   acquire communication data from a communication link;
   analyze the communication data and acquire attribute information of the communication data and first information carried by the communication data;
   select a target information prompting manner from at least two information prompting manners based on the attribute information; and
   prompt the first information carried by the communication data in the target information prompting manner,
   when the target information prompting manner includes the first information prompting manner, present the first information and source information of the communication data on a first display interface; and
   when the target information prompting manner includes the second information prompting manner, include:
      presenting second information and the source information of the communication data on a second display interface, wherein the first information is information requiring prevention of leakage to unintended recipient, the second information is information not requiring prevention of leakage to unintended recipient, the first display interface is a display interface of the terminal equipment configured to display the first information, and the second display interface is a display interface of the terminal equipment configured to display the second information;
      presenting the first information on the second display interface when the second display interface receives a particular operation, wherein the second information is different from the first information and configured to prompt receipt of the first information;
   acquire a second user information set, the second user information set including information of at least one user;
   match source user information of the communication data with the information of the at least one user in the second user information set; and
   upload an information record presented in the second display interface to an information storage server by taking the source user information of the communication data as an index in case of successful matching, wherein the information record is configured for the information storage server to respond to an information record acquisition request from the terminal equipment.

9. The information processing device according to claim 8, wherein the processor is further configured to:

present a combination of identifiers in the second display interface, and acquire the particular operation based on the combination of the identifiers; and analyze whether a sequence of the identifiers triggered by the particular operation is matched with a pre-set identifier sequence, and when the sequence of the identifiers triggered by the particular operation is matched with the pre-set identifier sequence, present the first information on the second display interface.

10. The information processing device according to claim 8, wherein the processor is further configured to:

extract source user information and target user information of the communication data from the attribute information;

acquire a first user information set from a terminal equipment, the first user information set including information of at least one user; and when the target user information indicates that the communication data is directed to only one target user, determine whether the source user information of the communication data is matched with the user information in the first user information set; and select the second information prompting manner as the target information prompting manner upon determination of a successful matching; and select the first information prompting manner as the target information prompting manner upon determination of an unsuccessful matching.

11. The information processing device according to claim 8, wherein the processor is further configured to:

extract source user information and target user information of the communication data from the attribute information;

acquire a first user information set from the terminal equipment, the first user information set including information of at least one user; and when the target user information indicates that the communication data is directed to at least two target users, determine whether the source user information and target user information of the communication data is matched with the information of the at least one user in the first user information set respectively; and select the second information prompting manner as the target information prompting manner upon determination of a successful matching; and select the first information prompting manner as the target information prompting manner upon determination of an unsuccessful matching.

12. The information processing device according to claim 8, wherein the processor is further configured to:

extract target user information of the communication data from the attribute information; and when the target user information indicates that the communication data is directed to at least two target users, select the first information prompting manner as the target information prompting manner.

13. The information processing device according to claim 8, wherein the processor is further configured to:

switch the second display interface to a third display interface, and when the third display interface is switched back to the second display interface, detect whether the second display interface receives the particular operation, and when the second display interface receives the particular operation, present the first information on the second display interface, wherein the third display interface is configured to display information different from the first information or the second information.

14. The information processing device according to claim 8, wherein the processor is further configured to:

when the information record is deleted from stored information records, trigger the information storage server and the terminal equipment to delete the information record.

15. A non-transitory computer-readable medium, comprising stored therein executable instructions, which when executed by a processor, cause the processor to execute an information processing method, including:

acquiring communication data from a communication link;

analyzing the communication data and acquiring attribute information of the communication data and first information carried by the communication data;

selecting a target information prompting manner from at least two information prompting manners including a first information prompting manner and a second information prompting manner, based on the attribute information;

prompting the first information carried by the communication data in the target information prompting manner;

when the target information prompting manner includes the first information prompting manner, presenting the first information and source information of the communication data on a first display interface in the first information prompting manner; and when the target information prompting manner includes the second information prompting manner, including:

presenting second information and the source information of the communication data on a second display interface, wherein the first information is information requiring prevention of leakage to unintended recipient, the second information is information not requiring prevention of leakage to unintended recipient, the first display interface is a display interface of the terminal equipment configured to display the first information, and the second display interface is a display interface of the terminal equipment configured to display the second information;

presenting the first information on the second display interface when the second display interface receives a particular operation, wherein the second information is different from the first information and configured to prompt receipt of the first information;

acquiring a second user information set, the second user information set including information of at least one user;

matching source user information of the communication data with the information of the at least one user in the second user information set and uploading an information record presented in the second display interface to an information storage server by taking the source user information of the communication data as an index in case of successful matching, wherein the information record is configured for the information storage server to respond to an information record acquisition request from the terminal equipment.

\* \* \* \* \*